(12) United States Patent
Horita et al.

(10) Patent No.: US 10,922,963 B2
(45) Date of Patent: Feb. 16, 2021

(54) VEHICLE INFORMATION PROCESSING APPARATUS AND VEHICLE INFORMATION PROCESSING PROGRAM

(71) Applicant: HITACHI AUTOMOTIVE SYSTEMS, LTD., Hitachinaka (JP)

(72) Inventors: Yuki Horita, Tokyo (JP); Tsuneo Sobue, Tokyo (JP); Makoto Kudo, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 308 days.

(21) Appl. No.: 15/556,529

(22) PCT Filed: Mar. 22, 2016

(86) PCT No.: PCT/JP2016/059007
§ 371 (c)(1),
(2) Date: Sep. 7, 2017

(87) PCT Pub. No.: WO2016/167085
PCT Pub. Date: Oct. 20, 2016

(65) Prior Publication Data
US 2018/0053404 A1 Feb. 22, 2018

(30) Foreign Application Priority Data

Apr. 14, 2015 (JP) .................................. 2015-082152

(51) Int. Cl.
| G08G 1/01 | (2006.01) |
| B60R 21/00 | (2006.01) |
| G08G 1/16 | (2006.01) |
| G08G 1/09 | (2006.01) |

(52) U.S. Cl.
CPC ............ *G08G 1/0112* (2013.01); *B60R 21/00* (2013.01); *G08G 1/0133* (2013.01);
(Continued)

(58) Field of Classification Search
None
See application file for complete search history.

(56) References Cited

U.S. PATENT DOCUMENTS

| 9,779,628 B2 * | 10/2017 | Yamashiro ............... G08G 1/22 |
| 2002/0021229 A1 * | 2/2002 | Stein .................. B60K 31/0008 340/933 |

(Continued)

FOREIGN PATENT DOCUMENTS

| GB | 2485606 A | 5/2012 |
| JP | 2004-152125 A | 5/2004 |

(Continued)

OTHER PUBLICATIONS

Extended European Search Report dated Mar. 21, 2019 for the European Patent Application No. 16779876.8.

(Continued)

*Primary Examiner* — Navid Ziaeianmehdizadeh
(74) *Attorney, Agent, or Firm* — Volpe Koenig

(57) ABSTRACT

A vehicle information processing apparatus detects the relative positions multiple vehicles that travel on a road having multiple lanes in the same direction. The apparatus includes a vehicle travel information acquisition unit configured to acquire at least one of position information and speed information measured for a first vehicle, and at least one of position information and speed information measured for a second vehicle included in the multiple vehicles, and a vehicle travel information processing unit configured to successively compare acquire first vehicle travel information with second vehicle travel information acquired, and determine that reciprocity which is attribute information indicating a state in which the first vehicle and the second vehicle travel in different lanes is established between the first vehicle and the second vehicle if it is determined that an event that cannot occur when the first vehicle and the second vehicle travel in the same lane occurs.

11 Claims, 17 Drawing Sheets

(52) U.S. Cl.
CPC ............ *G08G 1/0145* (2013.01); *G08G 1/09* (2013.01); *G08G 1/16* (2013.01); *G08G 1/163* (2013.01); *G08G 1/167* (2013.01)

(56) References Cited

U.S. PATENT DOCUMENTS

| | | | | |
|---|---|---|---|---|
| 2008/0300776 | A1* | 12/2008 | Petrisor | ................ G08G 1/0112 |
| | | | | 701/118 |
| 2010/0121569 | A1* | 5/2010 | Nakamura | ............. G01C 21/30 |
| | | | | 701/532 |
| 2012/0109521 | A1* | 5/2012 | Rothschild | ......... G01C 21/3658 |
| | | | | 701/487 |
| 2015/0325127 | A1* | 11/2015 | Pandita | ................... G08G 1/16 |
| | | | | 701/431 |

FOREIGN PATENT DOCUMENTS

| | | | |
|---|---|---|---|
| JP | 2012-234373 | A | 11/2012 |
| JP | 2013-084126 | A | 5/2013 |
| JP | 2013-161113 | A | 8/2013 |

OTHER PUBLICATIONS

International Search Report, PCT/JP2016/059007, dated Jun. 14, 2016, 1 pg.
Japanese Office Action dated Oct. 9, 2018 for the Japanese Patent Application No. 2015-082152.
Chinese Office Action dated Dec. 24, 2019 for the Chinese Patent Application No. 201680013818.4.

* cited by examiner

TRAVELING ENVIRONMENT EXAMPLE IN PRESENT EMBODIMENT

FIG. 3

VEHICLE TRAVEL DATA GROUP 122

| 201 VEHICLE ID | 202 TIME | 203 POSITION INFORMATION | 204 POSITION ERROR INFORMATION (MAJOR DIAMETER /MINOR DIAMETER /ANGLE) | 205 SPEED [km/h] | 206 ORIENTATION [°] | 207 TURN SIGNAL | 208 TRAVEL ROAD (SECTION ID) | 209 LANE ID |
|---|---|---|---|---|---|---|---|---|
| 5000 | 2014/10/1 09:00:03.0 | 35.700000, 139.800170 | (3.0m/2.0m/90.0) | 30.0 | 90.0 | OFF | 6000 | 6000-1 |
|  | 2014/10/1 09:00:02.9 | 35.700000, 139.800160 | (3.0m/2.0m/90.0) | 30.2 | 90.0 | OFF | 6000 | 6000-1 |
|  | 2014/10/1 09:00:02.8 | 35.700000, 139.800150 | (3.0m/2.0m/90.0) | 30.4 | 90.0 | OFF | 6000 | 6000-1 |
|  | ... | ... | ... | ... | ... | ... | ... | ... |
| 5100 | 2014/10/1 09:00:03.0 | 35.700000, 139.800300 | (4.0m/3.0m/120.0) | 25.0 | 90.0 | OFF | 6000 | N/A |
|  | ... | ... | ... | ... | ... | ... | ... | ... |
| 5150 | 2014/10/1 09:00:03.0 | 35.699995, 139.800320 | (4.0m/3.0m/120.0) | 45.0 | 90.0 | OFF | 6000 | N/A |
|  | ... | ... | ... | ... | ... | ... | ... | ... |
| 5200 | 2014/10/1 09:00:03.0 | 35.699998, 139.800280 | (4.0m/3.0m/120.0) | 40.0 | 90.0 | OFF | 6000 | N/A |
|  | ... | ... | ... | ... | ... | ... | ... | ... |
| 5250 | 2014/10/1 09:00:03.0 | 35.699980, 139.800200 | (4.0m/3.0m/100.0) | 50.0 | 270.0 | OFF | 6001 | N/A |
|  | 2014/10/1 09:00:01.0 | 35.699980, 139.800400 | (4.0m/3.0m/100.0) | 50.0 | 290.0 | RIGHT | 6001 | N/A |
|  | ... | ... | ... | ... | ... | ... | ... | ... |
| 5300 | 2014/10/1 09:00:03.0 | 35.699980, 139.800280 | (4.0m/3.0m/100.0) | 45.0 | 270.0 | OFF | 6001 | N/A |
|  | ... | ... | ... | ... | ... | ... | ... | ... |

FIG. 4

VEHICLE-TO-VEHICLE RELATIVE RELATIONSHIP DATA GROUP 123

| VEHICLE ID 301 | VEHICLE GROUP ID 302 | TARGET VEHICLE ID 303 | FRONT-TO-REAR RELATIONSHIP 304 | RIGHT-TO-LEFT RELATIONSHIP 305 | RELATIVE RELATION 306 | LAST RELATIVE RELATIONSHIP DETERMINATION TIME 307 |
|---|---|---|---|---|---|---|
| 5000 | 1 | 5100 | FORWARD | N/A | N/A | N/A |
|  |  | 5150 | FORWARD | N/A | CONFLICTING | 2014/10/1 08:59:55.0 |
|  |  | 5200 | FORWARD | N/A | CONFLICTING | 2014/10/1 08:59:59.0 |
| 5100 | 1 | 5000 | REARWARD | N/A | N/A | N/A |
|  |  | 5150 | FORWARD | N/A | CONFLICTING | 2014/10/1 09:00:00.0 |
|  |  | 5200 | REARWARD | N/A | CONFLICTING | 2014/10/1 08:59:59.0 |
| 5150 | 2 | 5000 | REARWARD | N/A | CONFLICTING | 2014/10/1 08:59:59.0 |
|  |  | 5100 | REARWARD | N/A | CONFLICTING | 2014/10/1 08:59:55.0 |
|  |  | 5200 | REARWARD | N/A | CONFLICTING | 2014/10/1 09:00:00.0 |
| 5200 | 2 | 5000 | REARWARD | N/A | CONFLICTING | 2014/10/1 08:59:59.0 |
|  |  | 5100 | FORWARD | N/A | CONFLICTING | 2014/10/1 08:59:59.5 |
|  |  | 5150 | FORWARD | N/A | N/A | N/A |
| 5250 | 10 | 5300 | N/A | N/A | N/A | N/A |
| 5300 | 11 | 5250 | N/A | N/A | N/A | N/A |
| ... | ... | ... | ... | ... | ... | ... |

FIG. 5

VEHICLE GROUP DATA GROUP 124

| VEHICLE GROUP ID | TARGET ROAD SECTION ID | LANE ID | CONFLICTING VEHICLE GROUP | TARGET VEHICLE ID GROUP |
|---|---|---|---|---|
| 1 | 6000 | 6000-1 | 2 | 5000,5200,... |
| 2 | 6000 | 6000-2 | 1 | 5150,5200,... |
| ... | ... | ... |  | ... |
| 10 | 6001 | N/A |  | 5250 |
| 11 | 6001 | N/A |  | 5300 |
| ... | ... | ... |  | ... |

FIG. 9
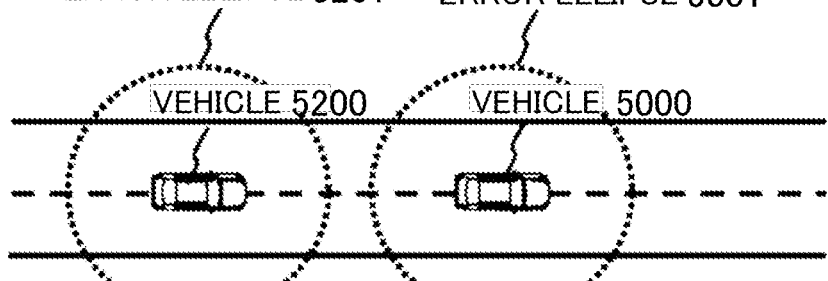
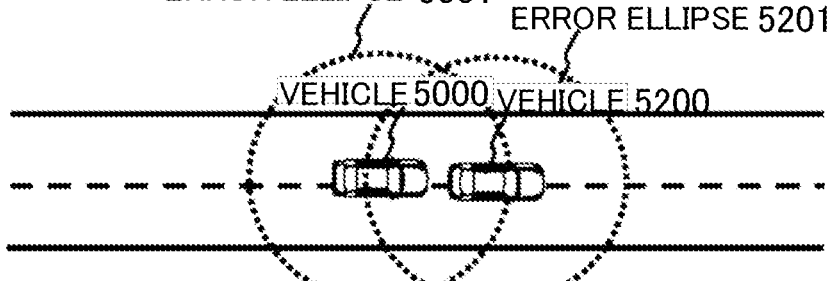
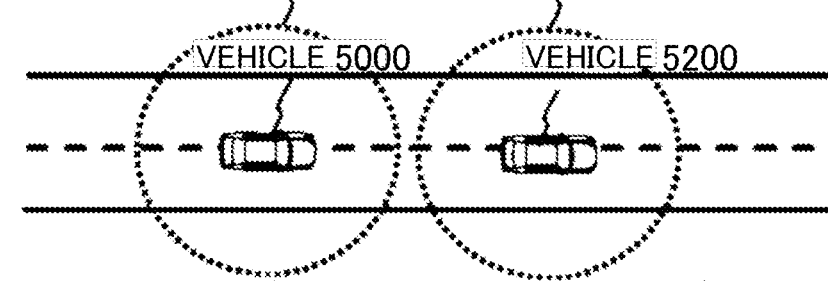

FIG. 12

INTEGRATION PROCESSING EXAMPLE OF VEHICLE GROUP

SCENE6021

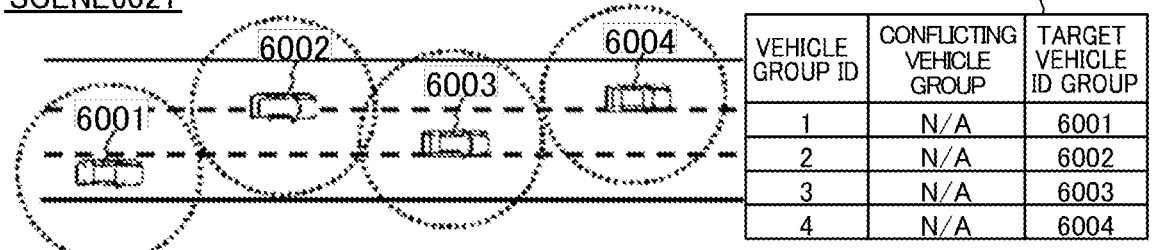

| VEHICLE GROUP ID | CONFLICTING VEHICLE GROUP | TARGET VEHICLE ID GROUP |
|---|---|---|
| 1 | N/A | 6001 |
| 2 | N/A | 6002 |
| 3 | N/A | 6003 |
| 4 | N/A | 6004 |

SCENE6022

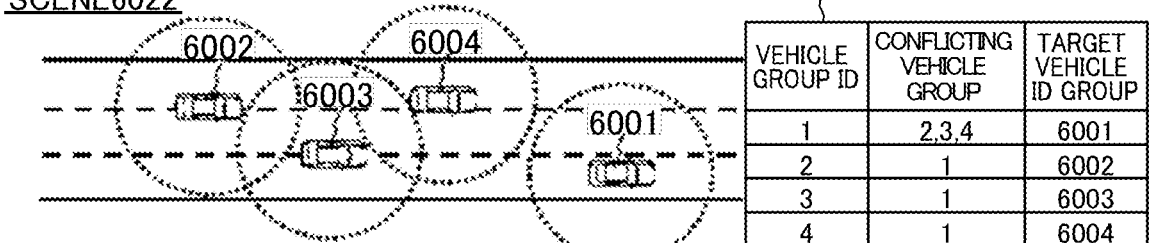

| VEHICLE GROUP ID | CONFLICTING VEHICLE GROUP | TARGET VEHICLE ID GROUP |
|---|---|---|
| 1 | 2,3,4 | 6001 |
| 2 | 1 | 6002 |
| 3 | 1 | 6003 |
| 4 | 1 | 6004 |

[CONFLICTING RELATIONSHIP]
(6001,6002),(6001,6003),(6001,6004)

SCENE6023

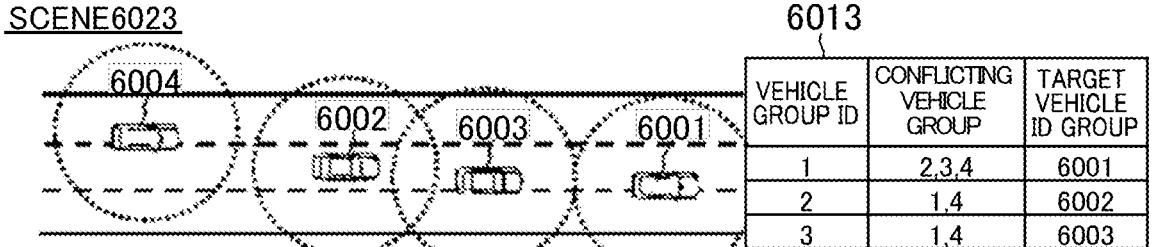

| VEHICLE GROUP ID | CONFLICTING VEHICLE GROUP | TARGET VEHICLE ID GROUP |
|---|---|---|
| 1 | 2,3,4 | 6001 |
| 2 | 1,4 | 6002 |
| 3 | 1,4 | 6003 |
| 4 | 1,2,3 | 6004 |

[CONFLICTING RELATIONSHIP]
(6001,6002),(6001,6003),(6001,6004)
(6002,6004),(6003,6004)

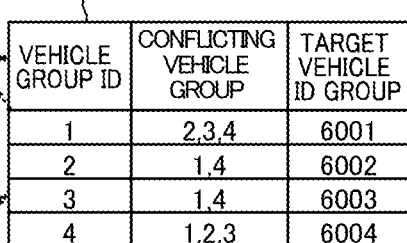

| VEHICLE GROUP ID | CONFLICTING VEHICLE GROUP | TARGET VEHICLE ID GROUP |
|---|---|---|
| 1 | 2,4 | 6001 |
| 2 | 1,4 | 6002,6003 |
| 4 | 1,2 | 6004 |

SCENE6024

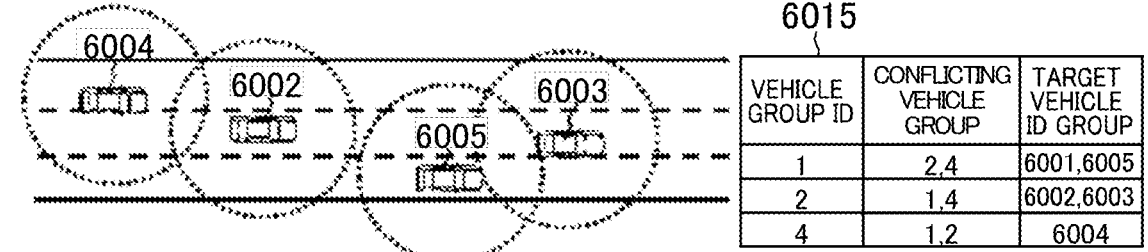

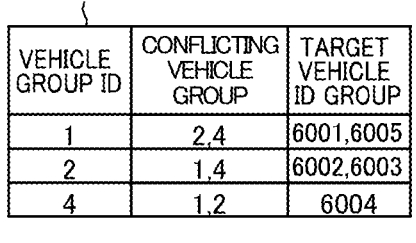

| VEHICLE GROUP ID | CONFLICTING VEHICLE GROUP | TARGET VEHICLE ID GROUP |
|---|---|---|
| 1 | 2,4 | 6001,6005 |
| 2 | 1,4 | 6002,6003 |
| 4 | 1,2 | 6004 |

[CONFLICTING RELATIONSHIP]
(6001,6002),(6001,6003),(6001,6004),(6002,6004),(6003,6004)
(6004,6005),(6002,6005)

| | OFFSET DATA STRING | MEAN VALUE | VARIANCE (STANDARD DEVIATION) |
|---|---|---|---|
| VEHICLE GROUP 1101 | 8.5m,9.5m,7.5m | 8.5m | 0.67(0.82) |
| VEHICLE GROUP 1102 | 4.2m,6.0m,4.5m | 4.9m | 1.86(1.36) |
| VEHICLE GROUP 1103 | 2.4m,2.7m,1.5m | 2.2m | 0.26(0.51) |

VEHICLE INFORMATION PROCESSING APPARATUS AND VEHICLE INFORMATION PROCESSING PROGRAM

TECHNICAL FIELD

The present invention relates to a vehicle information processing apparatus and a vehicle information processing program.

BACKGROUND ART

A system has been known in which a relative relationship between a host vehicle and another vehicle is estimated on the basis of travel information such as latitude, longitude and a speed of another vehicle acquired by vehicle-to-vehicle communication, and a driving support and the travel of the vehicle are automatically controlled. However, the latitude and longitude transmitted by vehicle-to-vehicle communication are generally based on the positioning of a GNSS (Global Navigation Satellite System), and a positioning error of about several tens of meters can occur. Therefore, it is difficult to accurately estimate a relative relationship between the host vehicle and another vehicle.

On the contrary, Patent Literature 1 proposes a device that calculates a similarity of a speed pattern between the host vehicle and another vehicle, and determines that the other vehicle travels in the same lane as that of the host vehicle if the similarity is higher than a certain threshold value.

CITATION LIST

Patent Literature

Patent Literature 1: Japanese Unexamined Patent Application Publication No. 2013-84126

SUMMARY OF INVENTION

Technical Problem

However, in the above Patent Literature 1, since it is determined whether the lane is the same depending on the similarity of the speed patterns, for example, if there are vehicles having similar speed patterns on different lanes, there is a problem that it is erroneously determined that the lane is the same.

In view of the foregoing, it is an object of the present invention to provide a vehicle information processing apparatus and a vehicle information processing program which are capable of more precisely determining a relationship of traveling lanes in a plurality of vehicles.

Solution to Problem

In order to achieve the above object, according to one aspect of the present invention, there is provided a vehicle information processing apparatus for detecting a relative position relationship between a plurality of vehicles that travel on a road having a plurality of lanes in the same direction including: a vehicle travel information acquisition unit that is configured to acquire first vehicle travel information including at least one of position information and speed information measured for a first vehicle included in the plurality of vehicles, and second vehicle travel information including at least one of position information and speed information measured for a second vehicle included in the plurality of vehicles; and a vehicle travel information processing unit that is configured to successively compare the first vehicle travel information with the second vehicle travel information acquired by the vehicle travel information acquisition unit, and determine that reciprocity which is attribute information indicating a state in which the first vehicle and the second vehicle travel in different lanes is established between the first vehicle and the second vehicle if it is determined that an event that cannot occur when the first vehicle and the second vehicle travel in the same lane occurs.

In order to achieve the above object, according to another aspect of the present invention, there is provided a vehicle information processing program for detecting a relative position relationship between a plurality of vehicles that travel on a road having a plurality of lanes in the same direction, causing a computer having a processor and a memory to execute: a step of acquiring first vehicle travel information including at least one of position information and speed information measured for a first vehicle included in the plurality of vehicles, and second vehicle travel information including at least one of position information and speed information measured for a second vehicle included in the plurality of vehicles; and a step of successively comparing the first vehicle travel information with the second vehicle travel information acquired by the vehicle travel acquisition unit, and determining that reciprocity which is attribute information indicating a state in which the first vehicle and the second vehicle travel in different lanes is established between the first vehicle and the second vehicle if it is determined that an event that cannot occur when the first vehicle and the second vehicle travel in the same lane occurs.

Advantageous Effects of Invention

According to the present invention, a relationship of the traveling lanes in the multiple vehicles can be determined with higher precision.

BRIEF DESCRIPTION OF DRAWINGS

FIG. 3 is an illustrative view of an example of a data structure of a vehicle traveling data group 122 held by a vehicle surrounding recognition device 10 according to the first embodiment of the present invention.

FIG. 4 is an illustrative view of an example of a data structure of a vehicle-to-vehicle relative relationship data group 123 held by the vehicle surrounding recognition device 10 according to the first embodiment of the present invention.

FIG. 5 is an illustrative diagram of an example of a data structure of a vehicle group data group 124 held by the vehicle surrounding recognition device 10 according to the first embodiment of the present invention.

FIG. 9 is an illustrative view of an example of a specific scene illustrating conflicting relationship determination means using a front-rear relationship of two vehicles in the vehicle surrounding recognition device 10 according to the first embodiment of the present invention.

FIG. 12 is an illustrative view of an example of a specific scene illustrating the vehicle-to-vehicle relative relationship determination process 800 in the vehicle surrounding recognition device 10 according to the first embodiment of the present invention.

DESCRIPTION OF EMBODIMENTS

Hereinafter, embodiments of the present invention will be described with reference to the drawings.

First Embodiment

Figure 1:
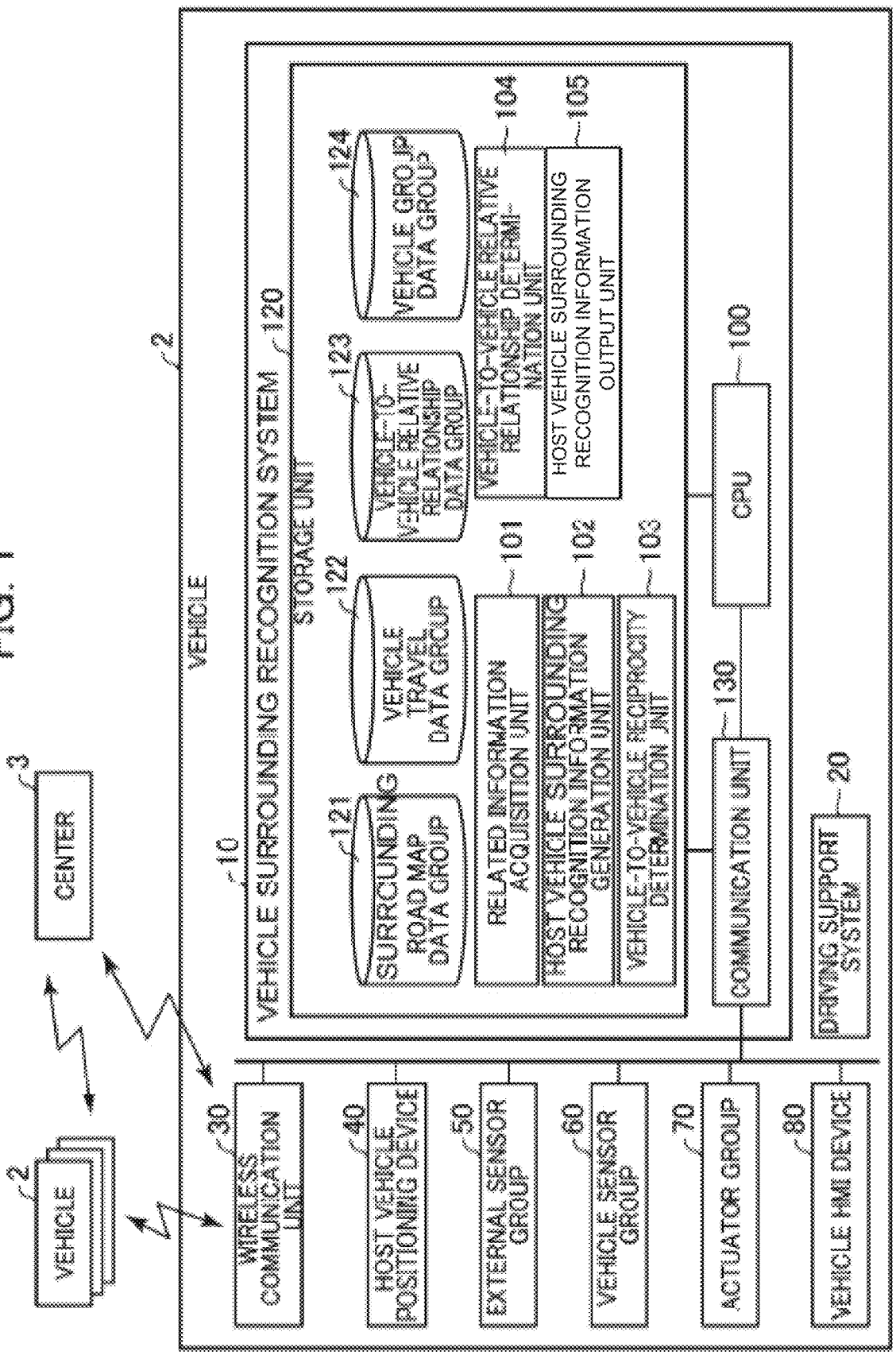
FIG. 1 is a functional block diagram illustrating an example of a configuration of a vehicle surrounding recognition system 1 according to a first embodiment of the present invention.

FIG. 1 is a functional block diagram illustrating an example of a configuration of a vehicle surrounding recognition system 1 (vehicle information processing device) according to a first embodiment of the present invention. As illustrated in FIG. 1, a vehicle surrounding recognition system 1 according to the present embodiment is a system that is mounted on a vehicle 2 for recognizing a situation of an obstacle such as a traveling road or a vehicle around the vehicle 2. The vehicle surrounding recognition system 1 includes a vehicle surrounding recognition device 10 (vehicle information processing apparatus), a driving support device 20, a wireless communication unit 30, a host vehicle position measurement device 40, an external sensor group 50, a vehicle sensor group 60, an actuator group 70, a vehicle HMI (human machine interface) device 80, and so on. The vehicle 2 includes all kinds of vehicles capable of traveling on ground such as electric vehicles, and fuel cell vehicles in addition to conventional automobiles.

The vehicle surrounding recognition device 10 is, for example, an ECU (Electronic Control Unit) or the like mounted on the vehicle 2, and includes a processing unit, a storage unit 120, and a communication unit 130. The vehicle surrounding recognition device 10 has no particular limitation on a form, and, for example, may be integrated into a driving support device 20 or the external sensor group 50, or may be an external device such as a smartphone connected to a vehicle network by a user of the vehicle 2.

The processing unit is configured to include, for example, a CPU 100 (Central Processing Unit) and a memory such as a RAM (Random Access Memory), and executes a predetermined operation program stored in the storage unit 120 to perform a process for realizing a function of the vehicle surrounding recognition device 10.

The storage unit 120 is configured to include, for example, storage devices such as an HDD (Hard Disk Drive), a flash memory, and a ROM (Read Only Memory), and stores programs to be executed by the processing unit and data groups necessary for realizing the present system. In the present embodiment, more particularly, programs of a related information acquisition unit 101 (vehicle traveling information acquisition unit) that acquires various kinds of information (surrounding road map, received information of the wireless communication unit 30, host vehicle position measurement information, external recognition information, vehicle sensor information, and so on) necessary for a process related to the vehicle surrounding recognition of the vehicle 2, a vehicle surrounding recognition information generation unit 102 that generates information for recognizing a situation around the vehicle 2 based on the external information acquired by the related information acquisition unit 101, a vehicle-to-vehicle reciprocity determination unit 103 (vehicle traveling information processing unit) that determines reciprocity between the vehicles based on the information on another vehicle acquired through the host vehicle and the wireless communication unit 30, and so on, a vehicle-to-vehicle relative relationship determination unit 104 that determines a relative relationship between the vehicles with the use of the determined reciprocity between the vehicles and the like, a vehicle surrounding recognition information output unit 105 that outputs the vehicle surrounding recognition information generated by the vehicle surrounding recognition information generation unit 102 to another device, and so on, as well as a surrounding road map data group 121, a vehicle traveling data group 122, a vehicle-to-vehicle relative relationship data group 123, a vehicle group data group 124, and the like are stored in the storage unit 120.

The surrounding road map data group 121 of the vehicle surrounding recognition device 10 is a group of digital road map data related to the roads around the vehicle 2 necessary for determination of a traveling road of the host vehicle and recognition of attribute information (the number of lanes, and so on) related to the traveling road. The surrounding road map data group 121 includes, for example, information on a network structure, attributes (road type, speed limit, number of lanes, direction of traveling, and so on), a shape (shape of road, shape of intersection, and so on), and so on. As a management method of the surrounding road map data group 121, the entire map data may be previously stored in the vehicle surrounding recognition device 10, may be received from another device having map data such as a navigation apparatus, or may be received from the outside of the vehicle 2 through the wireless communication unit 30.

The vehicle traveling data group 122 of the vehicle surrounding recognition device 10 is an aggregation of data relating to the traveling information of the vehicle 2 or another vehicle. The traveling information includes, for example, positional information such as latitude, longitude, a traveling road, and the like of the vehicle, movement information such as a speed, a traveling orientation, acceleration, a yaw rate, and the like, and control information such as a turn signal and an accelerator opening degree, and the like. In the case of the vehicle 2, various pieces of information are acquired from the host vehicle position measurement device 40, the vehicle sensor group 60, and the like. On the other hand, in the case of another vehicle, various pieces of information are acquired by direct communication means (for example, vehicle-to-vehicle communication or the like) or indirect communication means (for example, communication through a center or the like) through the wireless communication unit 30.

The vehicle-to-vehicle relative relationship data group 123 of the vehicle surrounding recognition device 10 is an aggregation of data relating to a relative relationship with the vehicle 2 or another vehicle. The relative relationship between vehicles according to the present embodiment means whether those vehicles travel in the same lane. In the present embodiment, the relative relationship between the vehicles traveling in the same lane is referred to as "common", and the relative relationship between the vehicles traveling in different lanes is referred to as "conflicting".

The vehicle group data group 124 of the vehicle surrounding recognition device 10 is an aggregation of data relating to a vehicle group in the vehicle 2 and a plurality of other vehicles. The vehicle group is associated with a vehicle group having a similar relative relationship, and, for example, a group of vehicles determined to travel in the same lane are associated as the same group.

The communication unit 130 includes a network card or the like compliant with communication standards such as Ethernet (registered trademark) or CAN (Controller Area Network), and performs data transmission and reception with other devices installed in the vehicle 2 based on various protocols. The communication unit 130 and the other devices installed in the vehicle 2 are not limited to the wired connection such as Ethernet, but may be a short-range wireless connection such as a Bluetooth (registered trademark), a wireless LAN (Local Area Network) or the like.

The driving support device 20 is, for example, an ECU for realizing the Advanced Driver Assistance Systems (ADAS) of the vehicle 2. For the purpose of enhancing a fuel economy performance, safety and convenience, for example, the driving support device 20 issues an instruction to the actuator group 70 to automatically control acceleration and deceleration and steering of the vehicle 2, or to output an information supply or a warning to the driver through the in-vehicle HMI device 80, based on the vehicle surrounding recognition information output from the vehicle surrounding recognition device 10.

The wireless communication unit 30 has a network card or the like which conforming to a long distance wireless communication standard such as LTE (Long Term Evolution) or a short distance wireless communication standard such as a wireless LAN or DSRC (Dedicated Short Range Communications). For example, the wireless communication unit 30 is configured to enable data communication with at least one of a center 3 that supports the traveling of one or more vehicles, a roadside device (not shown) that is installed on one or more roads, the wireless communication unit 30 that is mounted on one or more other vehicles, a communication terminal (not shown) that is possessed by one or more persons, and the like.

The host vehicle position measurement device 40 is a device that measures a geographical position of the vehicle 2 and provides the measured information. The host vehicle position measurement device 40 corresponds, for example, to a global navigation satellite system (GNSS). The host vehicle position measurement device 40 may be configured to simply provide the measured result based on radio waves received from the GNSS satellite, or may be configured to perform position interpolation and an error correction by leveraging information that can be acquired from the external sensor group 50 or the vehicle sensor group 60 such as a traveling speed and a traveling azimuth of the vehicle 2. The information indicating the position of the vehicle 2 acquired by the host vehicle position measurement device 40 is typically a value of a predetermined geographical coordinate system such as latitude and longitude, but may be other information than the above information as long as the information can be used for specifying the road on which the vehicle 2 is traveling. For example, the information indicating the position of the vehicle 2 may be information indicating the road on which the vehicle 2 is traveling and the position on the road.

The external sensor group 50 is a sensor group capable of recognizing obstacles (other vehicles, bicycles, pedestrians, falling objects, and so on) and features (road signs, white lines, landmarks, and so on) in a given area around the vehicle 2. The external sensor group 50 corresponds to, for example, a camera device, a radar, a laser radar, a sonar, and so on. The external sensor group 50 outputs the information on the detected obstacles and features around the vehicle 2 (for example, a relative distance and a relative angle from the vehicle 2, and so on) to the in-vehicle network, and the vehicle surrounding recognition device 10 is configured so as to acquire the output result through the in-vehicle network. In the present embodiment, the external sensor group 50 is configured to implement a process of detecting the obstacles and the features. Alternatively, the external sensor group 50 may output data without processing the data, and another device such as the vehicle surrounding recognition device 10 may perform the detection process.

The vehicle sensor group 60 is a group of devices that detect the states of various parts of the vehicle 2 (for example, a traveling speed, a steering angle, an operation amount of an accelerator, an operation amount of a brake, and so on). The vehicle sensor group 60 periodically outputs a detected state quantity to the in-vehicle network such as CAN. The device connected to the in-vehicle network including the vehicle surrounding recognition device 10 is configured so as to acquire the state quantity of various parts.

The actuator group 70 is a group of devices for controlling elements to be controlled such as a steering, a brake, and an accelerator which determine the movement of the vehicle 2. The actuator group 70 is configured to control the movement of the vehicle 2 based on operation information such as the steering wheel, the brake pedal, or the accelerator pedal by the driver, and a target control value output from the driving support device 20.

The in-vehicle HMI device 80 is, for example, a display device or the like mounted on the vehicle 2. The in-vehicle HMI device 80 is configured to notify the driver of the vehicle surrounding recognition information output from the vehicle surrounding recognition device 10 and information on driving support output from the driving support device 20 through sound or a screen.

The center 3 is, for example, an aggregation of servers that aggregate and manage information on one or a plurality of vehicles 2 and provides information for supporting traveling of the vehicle 2. The center 3 is configured so as to communicate with one or more vehicles 2 through a long distance wireless communication standard such as LTE, or a short distance wireless communication standard such as a wireless LAN, or DSRC.

Figure 2:
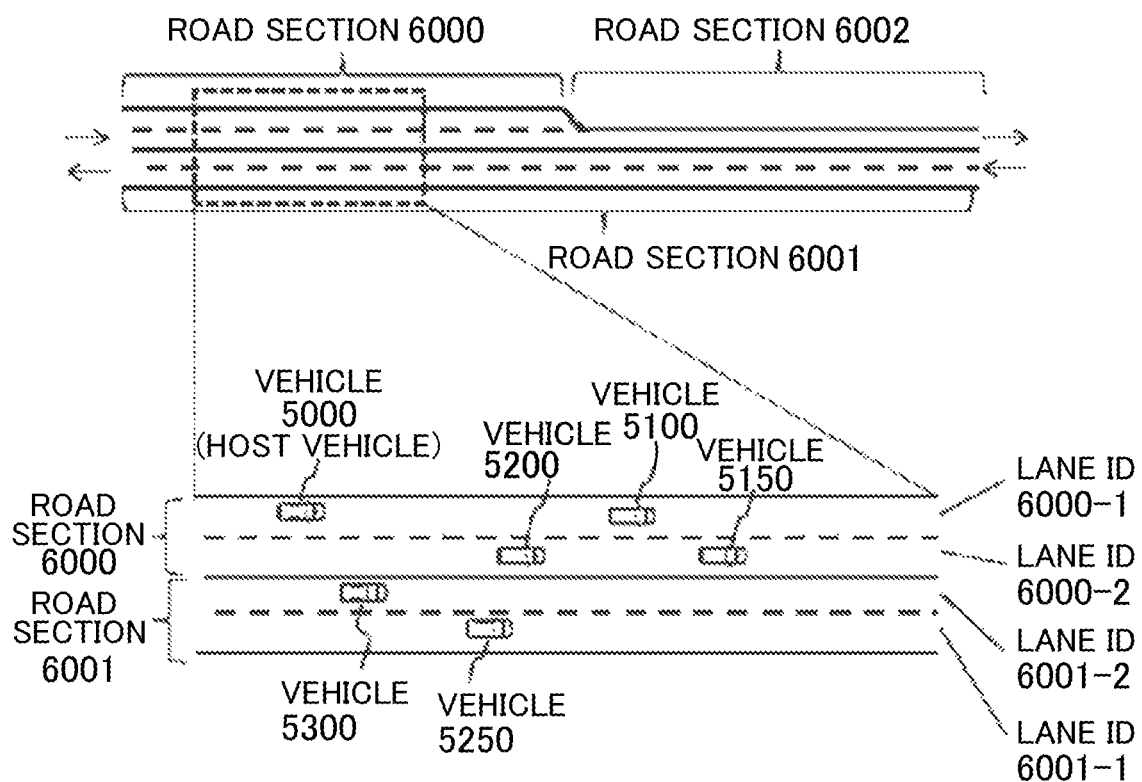
FIG. 2 is an illustrative view of an example of a traveling road environment of a vehicle according to the first embodiment of the present invention.

FIG. 2 shows an example of a traveling road environment of a vehicle used for describing the contents of terms and data in the present embodiment.

In the present embodiment, the road is treated as an aggregation of road sections. For example, each road section indicates a section having the same lane configuration on a road along a way. This means that the road section is switched to another when the number of lanes is changed. In the case of a bidirectional road where lanes are provided, the road sections are assigned to each traveling direction.

Each of the road sections has an identifier called a road section ID. In FIG. 2, road section IDs 6000 to 6002 are shown as an example of the road sections. Hereinafter, values of the road section IDs are referred to as reference numerals of the road sections identified by the road section IDs. For example, the road section identified by the road section ID 6000 is also simply referred to as a road section 6000.

The road section has one or more lanes. Each of the lanes has an identifier called a lane ID, and the lane ID of an n-th lane from the outside of the appropriate road section is assumed to be expressed in the form of "road section ID-n". For example, in FIG. 2, the road section 6000 has two lanes, but the respective lane IDs are represented as 6000-1 and 6000-2 from the outside.

A traveling road environment example of FIG. 2 shows a state in which vehicles 5000 (host vehicle) and 5100 travel in a lane 6000-1 of a road section 6000, vehicles 5150 and 5200 travel in a lane 6000-2 of the road section 6000, a vehicle 5250 travels on a road section 6001-1 of a road section 6000-1, and a vehicle 5300 travels on a road section 6001-2.

Next, a data group used in the vehicle surrounding recognition device 10 according to the present embodiment will be described. The data group according to the present embodiment is held in a table form in the storage unit 120. First, an example of a data structure of the vehicle traveling data group 122 in the vehicle surrounding recognition device 10 will be described with reference to FIG. 3. The vehicle traveling data group 122 comprehensively stores information on the traveling state of each vehicle.

The vehicle ID 201 is an identifier of the vehicle related to the data entry. The vehicle ID may be a vehicle identification number defined in the industry, for example, as long as the vehicle ID can be identified between the vehicles, or may be an ID for temporarily generated vehicle identification to be used for the vehicle-to-vehicle communication or the like.

A time 202 represents a target time of data specified by reference numerals 203 to 209 in the data entry or a time of data acquisition. The position information 203 and the position error information 204 represent position information (latitude, longitude) and error information measured at a time 202. The position error information 204 is expressed by, for example, a major axis, a minor axis, and a slope of the major axis relating to an error ellipse indicating a standard deviation of an error (a rotation angle viewed in a clockwise direction with north being 0°).

The speed 205, the orientation 206, and the turn signal 207 indicate a vehicle speed, the traveling orientation, and the turn signal condition of the vehicle 2 specified by the vehicle ID 201. A state of other lighting equipment useful for estimating the behavior of the vehicle 2 such as a hazard lamp besides the turn signal may be stored.

The traveling road section ID 208 and the lane ID 209 are identifiers of the traveling road section and the lane in which the vehicle ID 201 is traveling. The traveling road section ID and the lane ID are not necessarily specifiable and if the traveling road section ID and the lane ID cannot be specified, an invalid value "N/A" is stored.

In the present embodiment, the data of each vehicle is managed as time series data. For example, data is held for a predetermined number of data pieces or a predetermined time, and past data can be referred to some extent.

Next, an example of the data structure of the vehicle-to-vehicle relative relationship data group 123 in the vehicle surrounding recognition device 10 will be described with reference to FIG. 4. The vehicle-to-vehicle relative relationship data group 123 comprehensively stores information on a relative positional relationship between the specific vehicle 2 and another vehicle.

As with the vehicle ID 201 in FIG. 3, the vehicle ID 301 is an identifier for specifying the vehicle related to the data entry.

The vehicle group ID 302 is an identifier of the vehicle group to which the vehicle belongs.

The target vehicle ID 303 is an identifier of the vehicle having a relative relationship indicated by reference numerals 304 to 307 with the vehicle (vehicle ID 301).

The front-rear relationship 304 represents a front-rear relationship between the vehicle corresponding to the target vehicle ID 303 and the vehicle corresponding to the vehicle ID 301 with respect to the traveling direction of the road. More specifically, a value indicating whether the vehicle corresponding to the target vehicle ID 303 is located in front of or at the rear of the vehicle corresponding to the vehicle ID 301 is stored. If neither can be determined, an invalid value "N/A" is stored.

The right-left relationship 305 represents a right-left relationship with respect to the traveling direction of the road between the vehicle corresponding to the target vehicle ID 303 and the vehicle corresponding to the vehicle ID 301. If it can be determined that a vehicle corresponding to the target vehicle ID 303 is located in a lane on the left of a vehicle corresponding to the vehicle ID 301 with respect to the traveling direction, a value of "left" is stored, and a value of "right" is stored in the opposite case. If neither can be determined, an invalid value "N/A" is stored.

The relative relationship 306 represents a determination situation of whether the vehicle corresponding to the target vehicle ID 303 and the vehicle corresponding to the vehicle ID 301 are in a conflicting relationship or in a common relationship. When those vehicles are in the conflicting relationship to each other, "reciprocity" is stored. When those vehicles are in the common relationship, "common" is stored. When neither can be determined, an invalid value "N/A" is stored.

The relative relation final determination time 307 indicates a time at which the determination result stored in the relative relation 306 has been last derived.

Next, an example of a data structure of the vehicle group data group 124 in the vehicle surrounding recognition device 10 will be described with reference to FIG. 5. The vehicle group data group 124 comprehensively stores the attribute information related to the vehicle group acquired by the vehicle surrounding recognition device 10.

The vehicle group ID 401 is an identifier of the vehicle group that means a group of vehicles determined to be in a common relationship.

The target road section ID 402 and the lane ID 403 are identifiers of the road section and the lane where the group of vehicles belonging to the appropriate vehicle group is traveling. The invalid value "N/A" is stored when the determination is disabled.

The conflicting vehicle group ID group 404 is a list of identifiers of the vehicle groups that are determined to be in a conflicting relationship with the vehicle group corresponding to the vehicle group ID 401. For example, the conflicting vehicle group in the vehicle group in which the vehicle group ID in a first row is 1 means the vehicle group in which the vehicle group ID is 2.

The target vehicle ID group 405 is a list of identifiers of the vehicle groups belonging to the vehicle group corresponding to the vehicle group ID 401.

Subsequently, the operation of the vehicle surrounding recognition system 1 will be described. The vehicle surrounding recognition device 10 of the vehicle surrounding recognition system 1 according to the present embodiment executes, as a main process, a vehicle surrounding recognition process of grasping a relative relationship between the vehicle 2 and another vehicle based on the traveling data of another vehicle around the host vehicle acquired through the wireless communication unit 30 of the vehicle 2, and outputting the information related to the conflicting relationship to the outside.

Figure 6:
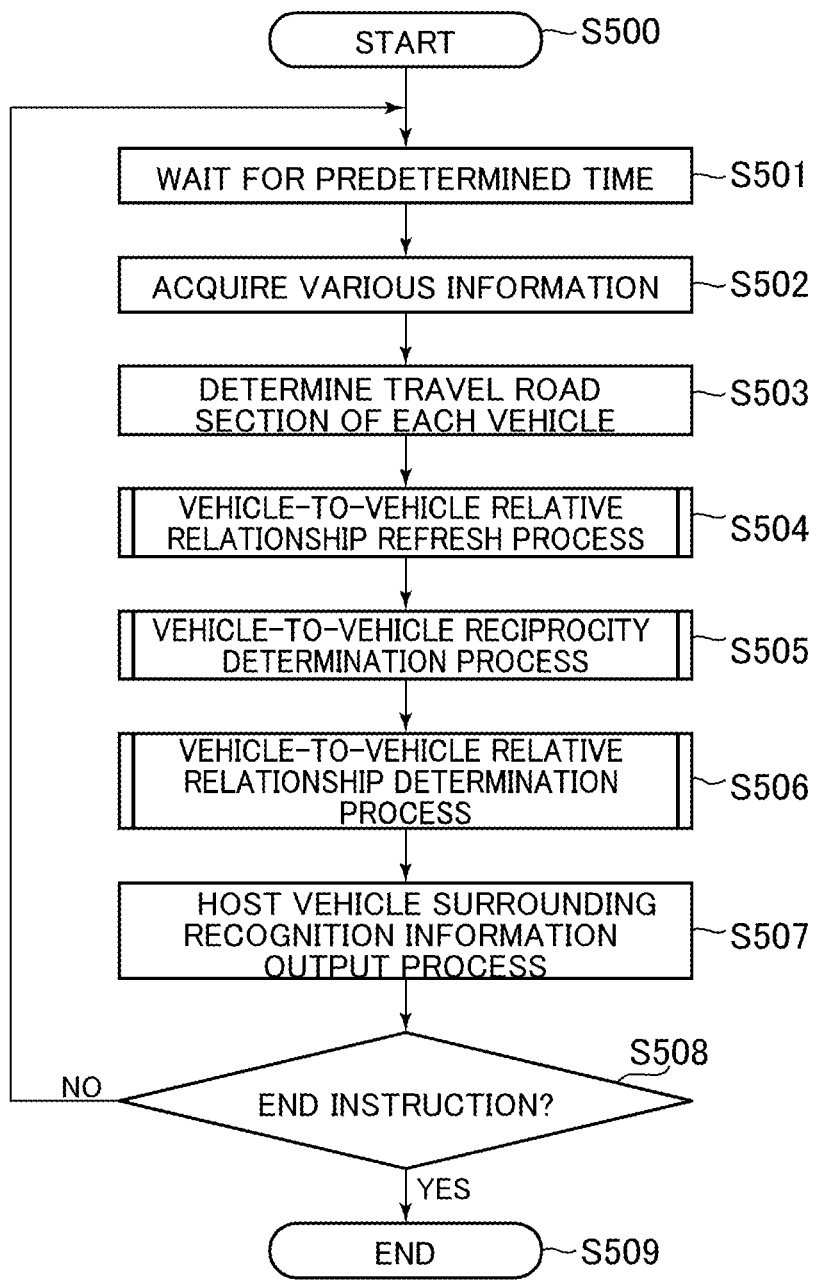
FIG. 6 is an illustrative view of a process flow example of a vehicle surrounding recognition process 500 to be executed in the vehicle surrounding recognition device 10 according to the first embodiment of the present invention.

FIG. 6 illustrates an example of a flow 500 of the vehicle surrounding recognition process to be executed in the vehicle surrounding recognition system 1 according to the present embodiment.

When the vehicle surrounding recognition device 10 is activated by starting an engine of the vehicle 2, turning on a power supply or the like (step 500, hereinafter "step" will be abbreviated as "S"), the vehicle surrounding recognition information generation unit 102 of the vehicle surrounding recognition device 10 first acquires various kinds of information necessary for the vehicle surrounding recognition process (S502) after waiting for a predetermined time (S501). In the present specification, the waiting for the predetermined time means that waiting for a time until a trigger for generating the vehicle surrounding recognition information is exerted. The trigger may be applied with a timer so as to be executed at regular time intervals or may be applied on demand upon detecting the necessity of updating the vehicle surrounding recognition information. The various kinds of information specified in S502 includes the host vehicle information such as the position measurement information and the sensor information of the vehicle 2, which are required for generating the vehicle surrounding recognition information, information on the (moving) obstacles of other vehicles which are obtained from the wireless communication unit 30, the external sensor group 50 and so on, the road environment information around the host vehicle, and the like. The various kinds of information specified in S502 is acquired from the surrounding road map data group 121 and the vehicle traveling data group 122 in the storage unit 120. Incidentally, the surrounding road map data group 121 and the vehicle traveling data group 122 are updated by acquiring the latest data from an external device or the like through the vehicle network or the like by the related information acquisition unit 101 of the vehicle surrounding recognition device 10 at an appropriate timing.

Next, in S503, the vehicle surrounding recognition information generation unit 102 of the vehicle surrounding recognition device 10 determines the road section where the host vehicle and the other vehicles are traveling with the use of the position measurement information, the road environment information around the host vehicle, and so on acquired in S502. More specifically, a method such as map matching used in a navigation device or the like is used. When the road section on which each vehicle is traveling is determined, the ID of the road section determined as the traveling road section ID 208 in the data entry of the appropriate vehicle in the vehicle traveling data group 122 is stored.

Subsequently, in S504, the vehicle-to-vehicle relative relationship determination unit 104 of the vehicle surrounding recognition device 10 confirms the validity of the vehicle relative relationship information determined in a previous cycle and executes a vehicle-to-vehicle relative relationship refreshing process for deleting the invalid information.

Figure 7:
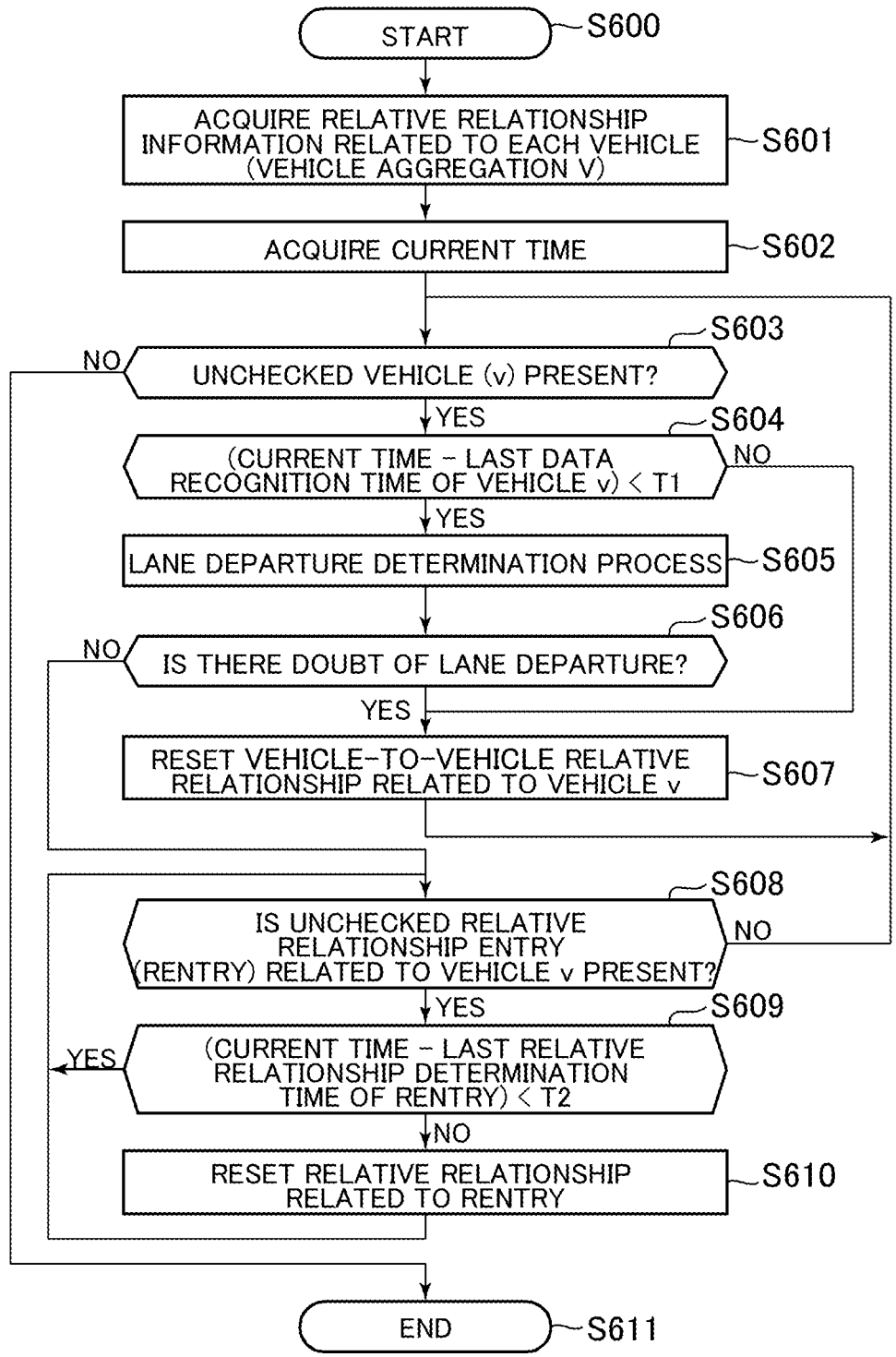
FIG. 7 is an illustrative view of a process flow example of a vehicle-to-vehicle relative relationship refreshing process 600 to be executed in the vehicle surrounding recognition device 10 according to the first embodiment of the present invention.

As a specific example of the vehicle-to-vehicle relative relationship refreshing process, FIG. 7 illustrates an example of a vehicle-to-vehicle relative relationship refreshing process flow 600.

First, when starting processing in S600, the vehicle-to-vehicle relative relationship determination unit 104 of the vehicle surrounding recognition device 10 acquires a relative relationship data entry group for each vehicle stored in the vehicle-to-vehicle relative relationship data group 123 in S601. In this example, it is assumed that an aggregation of the target vehicles from which the relative relationship data is acquired is V. The vehicle aggregation V includes the host vehicle in addition to the other vehicles around the host vehicle.

Next, a current time is acquired in S602. This time information is used to calculate an elapsed time from a predetermined time stamp in subsequent steps.

The process proceeds to S603, and the vehicle-to-vehicle relative relationship determination unit 104 checks whether there is a vehicle v that has not been checked (processing not executed in S604 and subsequent steps) in the vehicle aggregation V. If the vehicle v is not present (no in S603), the present processing is completed (S611). If there is an unchecked vehicle v (Yes in S603), the process proceeds to S604.

In S604, a final confirmation time of the data entry of the vehicle v is compared with the current time, and it is confirmed whether a predetermined time (T1) or more has elapsed. In this example, the final confirmation time of the data entry of the vehicle v corresponds to, for example, a time 202 of the latest data entry corresponding to the vehicle v of the vehicle traveling data group 122. If T1 or more has elapsed from the final confirmation time (no in S604), data of the appropriate vehicle has not been received for a while. Therefore, the process proceeds to S607 to reset the vehicle-to-vehicle relative relationship. On the other hand, if less than T1 has elapsed (yes in S604), the process proceeds to S605 and a lane departure determination process is performed.

The lane departure determination process in S605 is a process of determining whether the vehicle has left the lane on which the vehicle has been traveling until now. In this example, the determination of the lane departure does not necessarily determine the departure of the lane with precision, but determines whether there is a doubt about the lane departure. More specifically, for example, the lane departure determination process is performed by determining that the vehicle has moved to a different road section than before. Movement to the different road section means that the vehicle has left the road along the way due to the right or left turn, or the number of lanes on the traveling road has changed. For that reason, it can be said that there is strong suspicion of departing from the driving lane up to now. Alternatively, for example, referring to the turn signal information that can be acquired by the vehicle-to-vehicle communication or the like, the possibility of lane departure may be determined by detecting that the turn signal is on.

If the result of the lane departure determination process in S605 is that there is a doubt about the lane departure (yes in S606), the process proceeds to S607. After all of the vehicle-to-vehicle relative relationship data related to the appropriate vehicle v has been reset (deleted), the process returns to S603 in which a processing target is shifted to another unchecked vehicle v. In this example, the vehicle-to-vehicle relative relationship data related to the vehicle v corresponds to the data entry in which the vehicle ID 301 corresponds to the vehicle v and the data entry in which the target vehicle ID 303 corresponds to the vehicle v in the vehicle-to-vehicle relative relationship data group 123.

In the lane departure determination process of S605, if the vehicle group for which the vehicle departs from the lane is known, there is no need to reset all of the vehicle-to-vehicle relative relationship data, and the vehicle group ID for which the vehicle departs from the lane may be set as the vehicle group ID 302 of the data entry of the vehicle v. For example, when a lane change has been detected on the road section in which the number of lanes is 2, since it is apparent that the vehicle moves to a vehicle group which conflicting with the previous vehicle group, the vehicle group ID of the conflicting vehicle group may be set.

The process returns to S606, and if there is no doubt about the lane departure (no in S606), the process proceeds to S608. Since it is confirmed that the information on the vehicle v is valid in previous S604 to S607, it is then confirmed whether the relative relationship information with another vehicle in the vehicle v is valid. If there is no unchecked relative relation entry (rentry) relating to the vehicle v (no in S608), the process returns to S603 to shift the process to a next vehicle v. On the other hand, if the unchecked relative relation entry is present (yes in S608), the final relative relationship determination time 307 of rentry is compared with the current time in S609, and it is confirmed whether a predetermined time (T2) or more has elapsed. If T2 or more has elapsed (no in S609), the relative relationship (303 to 307 of the vehicle-to-vehicle relative relationship data group 123) related to rentry is reset (deleted) (S610), and the process returns to S608. On the other hand, if less than T2 has elapsed (yes in S609), the process returns to S608 without doing anything.

When it is determined that the relative relationship between the vehicles has not been confirmed for a predetermined time or more by the vehicle-to-vehicle relative relationship refreshing process described above, that is, that a risk that the relative relationship has changed is high, the appropriate entry is reset (deleted) from the vehicle-to-vehicle relative relationship data group 123. As a result, erroneous determination of the reciprocity due to a change in the vehicle-to-vehicle relative relationship caused by the lane change or the like can be prevented.

Returning to the processing flow of FIG. 6, when the vehicle-to-vehicle relative relationship refreshing process (S504) has been completed, the vehicle-to-vehicle reciprocity determination unit 103 of the vehicle surrounding recognition device 10 executes a vehicle-to-vehicle reciprocity determination process (S505) for extracting the reciprocity between the vehicles.

Figure 8:
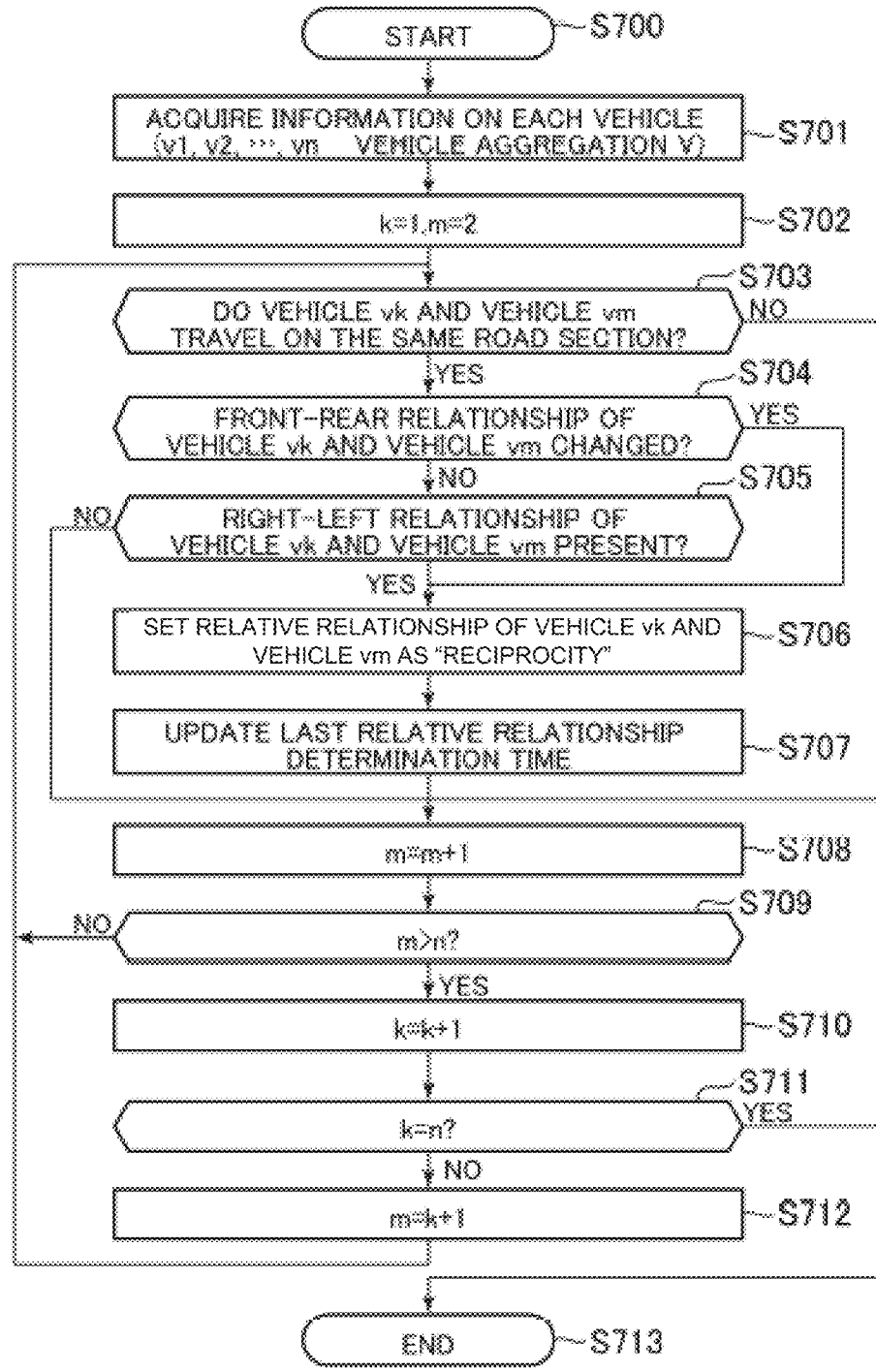
FIG. 8 is an illustrative view of a process flow example of a vehicle-to-vehicle reciprocity determination process 700 to be executed in the vehicle surrounding recognition device 10 according to the first embodiment of the present invention.

As a specific example of the vehicle-to-vehicle reciprocity determination process, FIG. 8 illustrates an example of a vehicle-to-vehicle reciprocity determination process flow 700.

First, when starting the processing in S700, the vehicle-to-vehicle reciprocity determination unit 103 of the vehicle surrounding recognition device 10 acquires travel data related to the group of vehicles stored in the vehicle travel data group 122 in S701. In this example, it is assumed that an aggregation of the vehicle group that has acquired the travel data is V again and n elements (vehicles v1, . . . , Vn) are included in the vehicle group. Incidentally, the vehicle aggregation V includes the host vehicle in addition to the other vehicles around the host vehicle. The determination process of whether there is the reciprocity of the combination of any two vehicles from the n elements (S703 to S706). Incidentally, since S702 and S708 to S712 are formal processing (in S702, the vehicles v1 and v2 are first selected as a target, and the combination of the vehicles is sequentially changed.) using parameters k and m for executing S703 to S706 on the combination of any two vehicles, the description will be omitted.

It is first confirmed whether any two vehicles vk and vm included in the vehicle aggregation V are traveling on the same road section (S703). If the traveling road sections are different from each other (no in S703), since there is no relationship between those two vehicles, the process proceeds to S708 and the process is shifted to the combination of next two vehicles.

On the other hand, when the traveling road sections are the same as each other (yes in S 703), the reciprocity between the vehicle vk and the vehicle vm is determined with the use of the determination means of S704 to S706 and so on. First, the process proceeds to S704, and it is confirmed whether a front-rear relationship between the vehicle vk and the vehicle vm has been changed. The fact that the front-rear relationship between the two vehicles has been changed means that the vehicle vk and the vehicle vm are not traveling in the same lane, that is, the vehicle vk and the vehicle vm are in a "conflicting" relationship. For that reason, when the change of the front-rear relationship has been detected (yes in S704), the relative relationship between the vehicle vk and the vehicle vm is set as "reciprocity" (S706), and the final relative relationship determination time 307 is updated (S 707).

Now, the means for determining the conflicting relationship using the front-rear relationship between the two vehicles will be described with reference to a specific example of FIG. 9.

An upper diagram represents position information (corresponding to the position information 203 of the vehicle traveling data group 122) and position error information (corresponding to the vehicle traveling data group 122 and the position error information 204) on the vehicle 5000 and the vehicle 5200 at a certain time (time t0). Incidentally, in this example, it is assumed that the error ellipse indicates a position area in which that the vehicle certainly exists can be statistically determined, such as 2σ or 3σ with respect to a standard deviation σ of an error variance. At this point in time, since the two error ellipses do not overlap with each other, the front-rear relationship between the vehicle 5000 and the vehicle 5200 can be distinctively separated from each other. For that reason, it can be determined that the vehicle 5200 is located at the rear of the vehicle 5000, and "rearward" is set in the front-rear relationship 304 of the appropriate data entry of the vehicle-to-vehicle relative relationship data group 123.

On the other hand, a position relationship between the respective vehicles at a time t1 (>t0) in a middle diagram shows that the vehicle 5200 is located in front of the vehicle 5000. However, since the respective error ellipses overlap with each other, the vehicle-to-vehicle reciprocity determination unit 103 of the vehicle surrounding recognition device 10 cannot determine that the vehicle 5200 is located in front of the vehicle 5000. For that reason, the corresponding front-rear relationship 304 of the vehicle-to-vehicle relative relationship data group 123 is maintained at "rearward".

Finally, a positional relationship between the respective vehicles at a time t2 (>t1) in a bottom diagram shows that the vehicle 5200 is positioned in front of the vehicle 5000 in a manner that the error ellipses do not overlap with each other. For that reason, "forward" is set as the front-rear relationship 304. This means that the positional relationship has been replaced between the front and the rear because the front-rear relationship 304 has been changed to "forward" from "rearward". In other words, it is found that the vehicle 5000 and the vehicle 5200 have traveled in the different lanes (in the conflicting relationship), and "reciprocity" is set in the relative relationship 306 of the vehicle-to-vehicle relative relationship data group 123.

In the above description, the error ellipse information is used as a margin for separating the front-rear relationship, but in the case where the error ellipse information is not available, a predetermined threshold value may be provided to deal with the separation of the front-rear relationship.

Returning to the flow of FIG. 8, if the reciprocity cannot be determined in S704 (no in S704), the process proceeds to S705. The conflicting relationship determination means in S705 determines the reciprocity based on a right-left relationship between the vehicle vk and the vehicle vm. In principle, if the two vehicles are located in a manner that error ellipses do not overlap with each other with respect to the right-left direction as in the method of determining the front-rear relationship, the right-left relationship can be separated. If the number of lanes is small, since a distance between the different lanes is short, it is difficult to determine the right-left relationship. On the other hand, if the number of lanes is large, since there is a sufficient distance between a leftmost lane and a rightmost lane, the right-left relationship can be determined.

Figure 10:
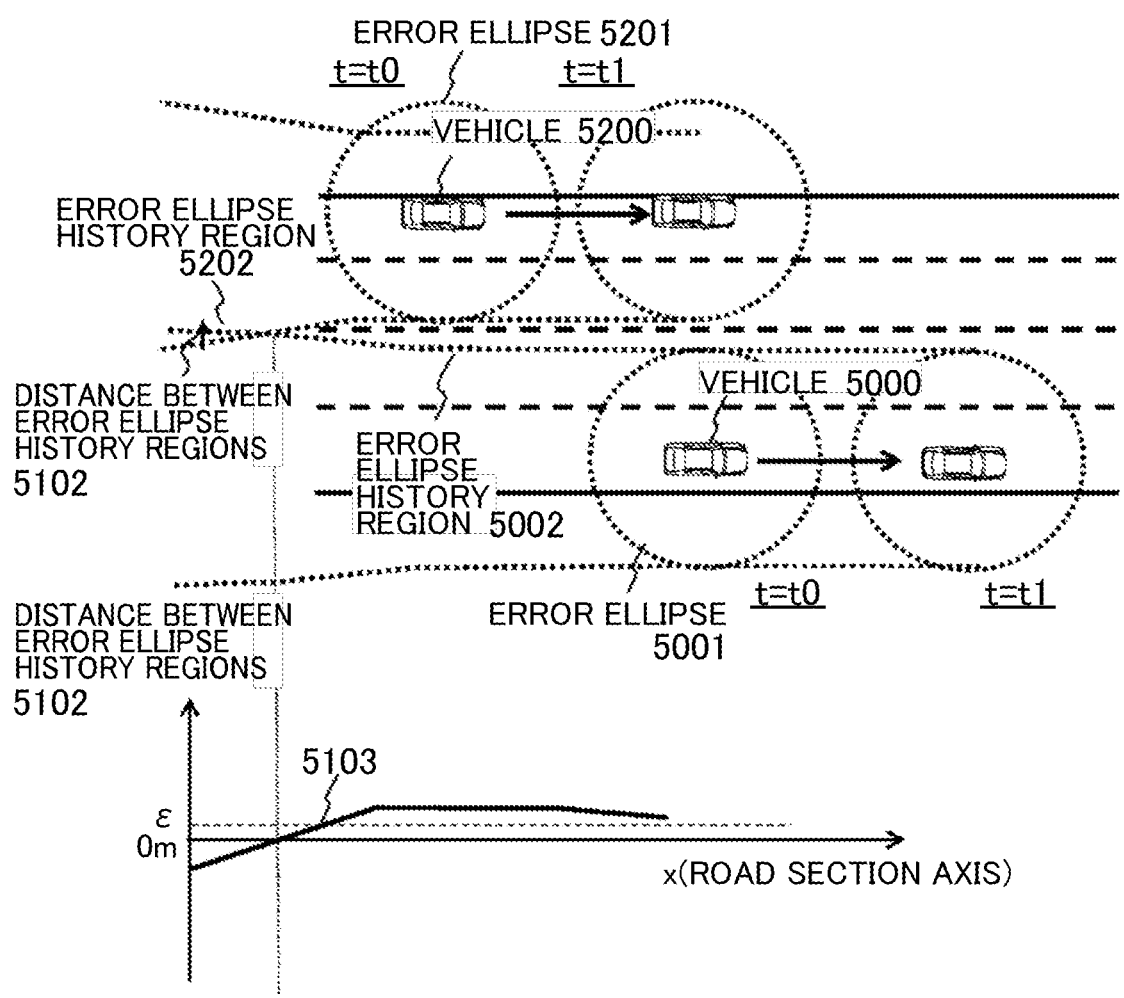
FIG. 10 is an illustrative view of an example of a specific scene illustrating conflicting relationship determination means using a right-left relationship of two vehicles in the vehicle surrounding recognition device 10 according to the first embodiment of the present invention.

Now, the means for determining the conflicting relationship based on the right-left relationship of the vehicles will be described with reference to a specific example illustrated in FIG. 10. An upper diagram of FIG. 10 illustrates position information and error ellipses (error ellipses 5001 and 5201) of the vehicle 5000 and the vehicle 5200 at a time t0 and a time t1 (>t0). Virtual areas connecting areas of the error ellipses of the vehicle 5000 and the vehicle 5200 on a time series are indicated as error ellipse history areas 5002 and 5202.

The left-right relationship between the two vehicles can be determined when there is a place where the error ellipses do not overlap with each other with respect to the right-left direction. In other words, this results in a problem of determining whether there is a place where the error ellipse history areas 5002 and 5202 do not overlap with each other.

A lower diagram is a graph of a distance 5102 between the error ellipse history areas along a road section axis. It is assumed that the distance when the areas do not overlap with each other is indicated by a positive value, and the distance when the areas overlap with each other is indicated by a negative value. In the example of the graph, the distance 5102 between the error ellipse history areas is indicated by a positive value in a predetermined section. Assuming that a margin for determination is E, the right-left relationship between the vehicle 5000 and the vehicle 5200 can be determined at the time of confirming the presence of 5103 whose value exceeds E. For example, the right-left relationship 305 of the vehicle 5200 to the vehicle 5000 is set as "leftward" in the vehicle-to-vehicle relative relationship data group 123. Further, since the determination of the right-left relationship means that the lanes in which the vehicles are traveling are different from each other, the appropriate relative relationship 306 is set immediately as "reciprocity" by the vehicle-to-vehicle reciprocity determination unit 103 (S706), and a final relative time determination time 307 is updated (S707). On the other hand, if the right-left relationship cannot be determined in S705 (no in S705), the process proceeds to S708 and the process proceeds to a next combination of the two vehicles.

Upon completion of confirming the combination of all the vehicles, k=n is established in S711, and the present process is completed (S713).

Through the processing described above, the combination of two vehicles having a conflicting relationship is extracted and set in the vehicle-to-vehicle relative relationship data group 306. Meanwhile, as a specific example of the vehicle-to-vehicle reciprocity determination process, the method of determining the reciprocity based on the front-rear relationship and the right-left relationship between the positions of the two vehicles has been described. Alternatively, other reciprocity determination methods may be incorporated. For example, the speed patterns may be compared between the vehicle vk and the vehicle vm located in the vicinity of each other, to thereby determine the reciprocity. Whether the vehicle vk and the vehicle vm are located in the vicinity of each other is, for example, to determine that the vehicle vk and the vehicle vm are located in the vicinity of each other if a relative distance between the two vehicles falls within a predetermined value. When the two vehicles close to each other travel in the same lane, a following vehicle needs to travel according to the acceleration and deceleration of a preceding vehicle. On the contrary, if there is a large difference in the speed pattern between the vehicle vk and the vehicle vm although those vehicles are traveling in the vicinity of each other, it can be determined that there is reciprocity. Also, the control information on the respective vehicles such as the brake and accelerator information is compared with each other, thereby being capable of determining the reciprocity of the travel patterns.

The process returns to the process flow of FIG. 6. Upon completion of the vehicle-to-vehicle reciprocity determination process (S505), the vehicle-to-vehicle relative relationship determination unit 104 of the vehicle surrounding recognition device 10 executes a vehicle-to-vehicle relative relationship determination process (S506) for determining the relative relationship between the vehicles based on the constraint conditions due to the determined reciprocity between the vehicles and the number of lanes.

Figure 11:
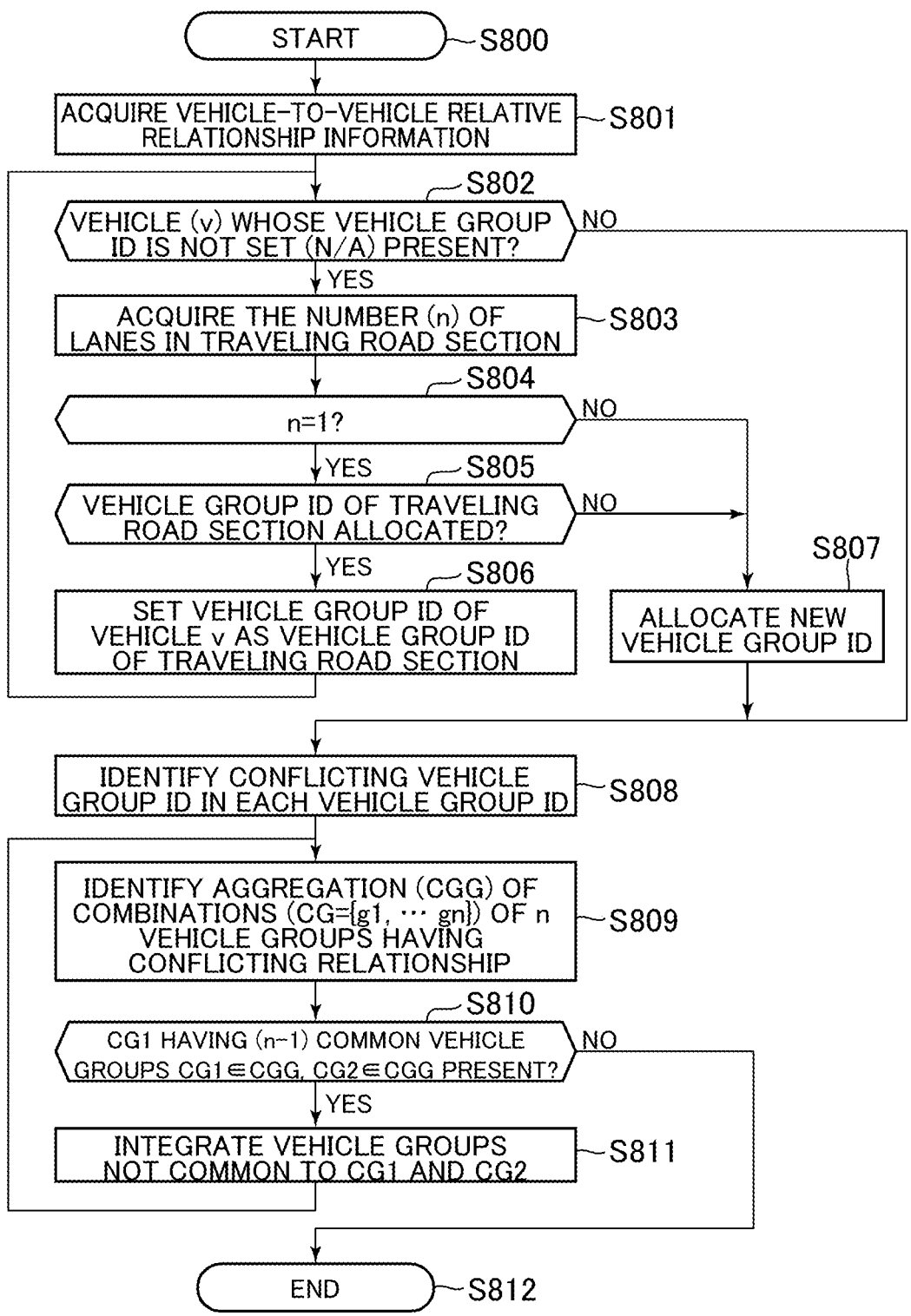
FIG. 11 is an illustrative view of a process flow example of a vehicle-to-vehicle relative relationship determination process 800 to be executed in the vehicle surrounding recognition device 10 according to the first embodiment of the present invention.

An example of a vehicle-to-vehicle relative relationship determination process flow 800 is shown in FIG. 11 as a specific example of the vehicle-to-vehicle relative relationship determination process.

Upon starting the processing in S800, the vehicle-to-vehicle relative relationship determination unit 104 of the vehicle surrounding recognition device 10 first refers to the vehicle-to-vehicle relative relationship data group 123, and acquires the vehicle-to-vehicle relative relationship information (S801). If there is no vehicle v whose vehicle group ID 302 is not set (N/A) in the acquired information (no in S802), the process proceeds to S808. On the other hand, if the vehicle v having the vehicle group ID 302 not set (N/A) is present (yes in S802), the processing of S803 to S807 is executed for all of the appropriate vehicles for allocation of the vehicle group ID.

First of all, the vehicle-to-vehicle relative relationship determination unit 104 acquires the number n of lanes in the road section in which the vehicle v travels in S803. Incidentally, the number n of lanes in the travel road section of the vehicle v can be acquired by referring to the traveling road section ID 208 of the vehicle traveling data group 122 to specify the traveling road section ID of the vehicle v, and further referring to the surrounding road map data group 121 with the use of the traveling road section ID.

Next, the vehicle-to-vehicle relative relationship determination unit 104 confirms in S804 whether the number n of lanes is 1. If the number of lanes is 1 (yes in S804), since it is naturally determined that the vehicle v travels in the lane, the vehicle group ID in the appropriate traveling road section is set to the vehicle group ID 302 of the vehicle v. Therefore, in S805, whether the vehicle group ID in the traveling road section has already been allocated is confirmed, for example, according to whether there is a data entry in which the target road section ID 402 in the vehicle group data group 124 is the appropriate traveling road section ID. If allocated (yes in S805), the same ID as the vehicle group ID 401 of the appropriate data entry is set to the vehicle group ID 302 of the vehicle v (S806). On the other hand, if the number of lanes is 2 or more (no in S804) or if the vehicle group ID in the traveling road section has not yet been allocated even if the number of lanes is 1 (no in S805), a new vehicle group ID is set to the vehicle group ID 302 of the vehicle v (S807).

When the vehicle group ID has been set for all of the vehicles (no in S802), a process of integrating the overlapping vehicle group IDs (S808 to S811) is then executed. For that reason, in S808, the vehicle-to-vehicle relative relationship determination unit 104 specifies the vehicle group ID conflicting with each vehicle group ID with the use of the relative relationship 306 of the vehicle-to-vehicle relative relationship data group 123, and sets the specified vehicle group ID to the conflicting vehicle group 404 of the vehicle group data group 124. More specifically, a data entry in which the relative relationship 306 of the vehicle-to-vehicle relative relationship data group 123 is "conflicting" is referred to, thereby being capable of specifying a pair of the vehicle group ID 302 and a vehicle group ID conflicting with the vehicle group ID 302 allocated to the vehicle indicated by the target vehicle ID 303. The vehicle group ID 302 allocated to the vehicle indicated by the target vehicle ID 303 can be specified by referring to the vehicle group ID 302 of the data entry whose vehicle ID 301 matches the target vehicle ID 303. Meanwhile, the relative relationships among the vehicle groups may be determined only when there is a relative relationship between m (m is an integer equal to or greater than 1) appropriate vehicles. The number of m is set to be large, thereby being capable of further enhancing the determination precision of the relative relationship between the vehicle groups.

Next, in S809, an aggregation (CGG) of combinations (CG) of n vehicle groups (g1, . . . , gn) having the conflicting relationships with each other is specified, where n is the number of lanes. First, the fact that the n vehicle groups having the conflicting relationships with each other means that there is a conflicting relationship with all other vehicle groups n−1 in all of gk (k=1, . . . , n). For example, if the number of lanes is 2, g1 and g2 having the conflicting relationship directly correspond to "a combination (CG) of n vehicle groups having the conflicting relationships with each other." For example, when the number of lanes is 3, g1 and g2, g2 and g3, and g3 and g1 have the conflicting relationships in three vehicle groups (g1, g2, g3), respectively. There may be a plurality (CG1, . . . , CGm) of "combinations (CG) of n vehicle groups having the conflicting relationship with each other, and an aggregation of the combinations is set as CGG.

Subsequently, in S810, the combination (CG1, CG2) of CGs common to n−1 vehicle groups is extracted from CGG. When there are the appropriate CG1 and CG2 (yes in S810), the vehicle groups (ga and gb, where ga ∈ CG1, gb ∈ CG2) that are not common to CG1 and CG2 are integrated (S811). For example, when the vehicle group gb is integrated into the vehicle group ga, all of the portions corresponding to the vehicle group ID of gb are replaced with the vehicle group ID of ga in the vehicle-to-vehicle relative relationship data group 123 and the vehicle group data group 124. In addition, since the information on the vehicle group gb can be treated as information on the vehicle group ga, for example, 403 to 405 of the vehicle group data group 124 are integrated by taking a set sum.

Upon completion of the integration process of the appropriate vehicle groups, the flow returns to S809, and the same processing is again performed. This is because there is a possibility that the combination of n vehicle groups having the conflicting relationship with each other is newly generated by the integration of the vehicle groups. Finally, in S810, when the combination of CGs common to n−1 vehicle groups is not found (no in S810), the present processing is completed (S812).

Now, a manner in which a vehicle group is created by a vehicle-to-vehicle relative relationship determination process flow 800 will be described with reference to a specific example of FIG. 12.

In an initial state, it is assumed that the vehicle group information is not created. When the vehicles 6001 to 6004 are detected in a scene 6021, since the vehicle group ID is not set and the number n of lanes is 3 in all of the vehicles, a new vehicle group ID is allocated to each vehicle through S807 (1 to 4, respectively). On the other hand, since the relative relationship between the respective vehicles is not clear, nothing occurs in the process of integrating the vehicle groups in the latter half of the process flow 800. The vehicle group information at that point of time is shown in a table 6011.

Subsequently, after transition to a scene 6022, the conflicting relationship between the vehicle 6001 and the vehicles 6002 to 6004 whose front-rear relationship is changed is specified. When the conflicting relationship between the vehicle groups is specified in S809 with the use of the conflicting relationship, a conflicting relationship shown in a table 6012 is obtained. At that time, in S809, since the combination of three vehicle groups having the conflicting relationship with each other is not present, the processing is completed without integrating the vehicle groups.

Further, after transition to a scene 6023, since the vehicle 6004 is moved backward and the front-rear relationship between the vehicle 6002 and the vehicle 6003 changes, it is specified that the vehicle 6004 has a conflicting relationship with the vehicle 6002 and the vehicle 6003. As a result, in S808, the conflicting relationship of the vehicle groups is updated as shown in a table 6013. In this example, a vehicle group aggregation (1, 2, 4) and a vehicle group aggregation (1, 3, 4) correspond to the combination CG of the three vehicle groups having the conflicting relationship with each other, and CGG={(1, 2, 4), (1, 3, 4)} is obtained in S809. Since (1, 2, 4) and (1, 3, 4) have two common vehicle groups 1 and 4, the condition of S810 is satisfied, and the vehicle groups 2 and 3 which are not common to both of the vehicle groups are integrated in S811. For example, when the vehicle group 3 is integrated into the vehicle group 2, a vehicle group relationship as shown in a table 6014 is created. In other words, this means that the vehicle 6002 and the vehicle 6003 travel in the same lane. Although the relationship between the traveling lanes of the vehicle 6002 and the vehicle 6003 is not directly found, with the use of the reciprocity with the other vehicles and the restriction of the number of lanes, the relationship between the traveling lanes of both the vehicles can be indirectly determined.

In addition, in a scene 6024, the vehicle 6005 is newly entering a road section to be processed from the back. Since the vehicle group to which the vehicle 6005 belongs cannot initially be specified, a new vehicle group ID (for example, 5) is allocated to the vehicle 5 in S807. In the scene 6024, since the front-rear relationship between the vehicle 6002 and the vehicle 6004 is changed, the vehicle 6005 has a conflicting relationship with the vehicle 6002 and the vehicle 6004. In other words, in S808, it is found that the vehicle group 5 of the vehicle 6005 has the conflicting relationship with the vehicle group 2 of the vehicle 6002 and the vehicle group 4 of the vehicle 6004. Since the vehicle group 2 and the vehicle group 4 also have the conflicting relationship with each other, in S809, existing (1, 2, 4) as well as (2, 4, 5) are also an element of CGG. Then, similarly to the above case, the vehicle groups 1 and 5 are integrated in S811, and the vehicle group relationship as shown in the table 6015 is established. In other words, although the vehicle 6005 determines only the conflicting relationship with the vehicle 6002 and the vehicle 6004, it is found that the vehicle 6005 travels in the same line as that of the vehicle 6001, and travels in the different lane from that of the vehicle 6003. In this manner, the relationship between the vehicles determined in the past is leveraged, as a result of which even when a vehicle newly appears, the conflicting relationship with another vehicle can be derived immediately from a limited relative relationship. In addition, in the scene 6024, the vehicle 6001 moves forward, resulting in a situation where it is difficult to directly estimate the relationship between the vehicle 6001 and the vehicle 6005. As described above, in the present embodiment, the relative relationship between the distant vehicles whose relative relationship cannot be directly estimated can be determined one after another with the use of the relationship between the vehicle groups.

The flow again returns to the process flow in FIG. 6. Upon completion of the vehicle-to-vehicle relative relationship determination process (S506), the vehicle surrounding recognition information output unit 105 of the vehicle surrounding recognition device 10 outputs the vehicle surrounding recognition information determined through the processing described above to the outside (S507).

Figure 13:
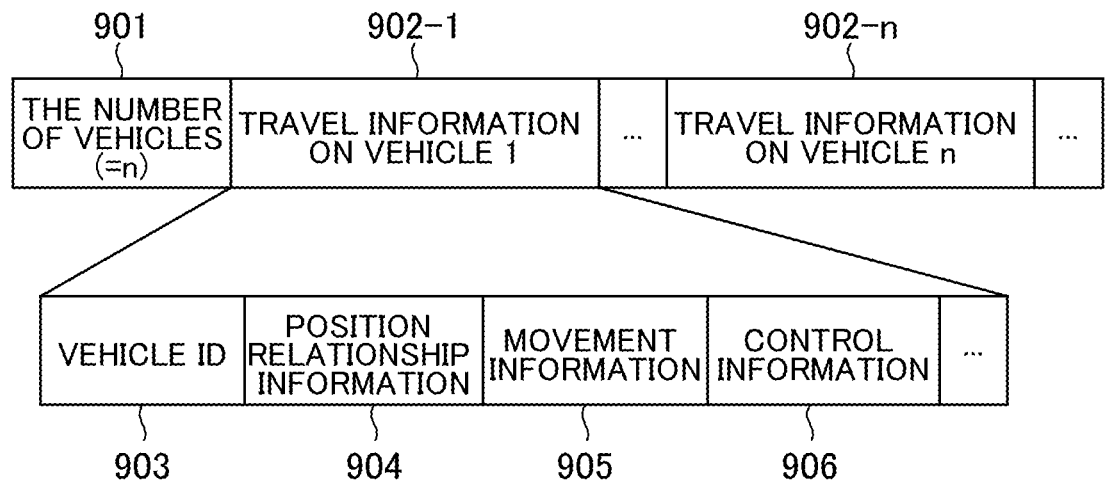
FIG. 13 is an illustrative view of an example of a format of a vehicle surrounding recognition information message 900 output by the vehicle surrounding recognition device 10 according to the first embodiment of the present invention.

FIG. 13 is an illustrative view of an example of a format 900 of a vehicle surrounding recognition information message transmitted by the vehicle surrounding recognition device 10 according to the present embodiment. The illustration of header information and the like concerning a communication protocol is omitted.

Information on a predetermined number of other vehicles located in the vicinity of the host vehicle is included in the vehicle surrounding recognition information message. The number of vehicles 901 indicates the number of other vehicle information included in this message. The traveling information of each of the other vehicles includes, for example, a vehicle ID 903, position related information 904, movement information 905, control information 906, and so on. The position related information 904 is information on positions of the appropriate other vehicle or positional relationships between the other vehicles and the host vehicle. The position related information 904 includes, for example, the position information 203 (latitude, longitude) of the vehicle traveling data group 122, the position error information 204, the traveling road section ID 208, the relative distances to the host vehicle, the front-rear relationship 304 of the vehicle-to-vehicle relative relationship data group 123, and so on. The movement information 905 is information relating to the movement of the other vehicles, and includes, for example, the speed 205, the orientation 206, the yaw rate, the acceleration, and so on. The control information 906 is information on the control of the other vehicles, and includes, for example, the turn signal 207, a brake, an accelerator opening degree, and so on.

In the present embodiment, for example, the information on the other vehicles traveling in the same lane as that of the host vehicle is output. As a result, for example, the driving support device 20 can grasp the relative relationships (front-rear relationship, relative distance, and so on) with the preceding other vehicles and behaviors (acceleration, deceleration, and so on) of the preceding other vehicles from the other vehicle information in the same lane received from the vehicle surrounding recognition device 10, and can perform an optimum speed control. Incidentally, various kinds of information included in the vehicle surrounding recognition information message is not limited to the example described above. With the collection of the information on a large number of vehicles including the host vehicle by the center 3 or the like of the vehicle surrounding recognition system 1, various intended purposes such that the various kinds of information is used for a wide area traffic control or the like are conceived.

The flow again returns to the process flow of FIG. 6. Upon completion of the vehicle surrounding recognition information output process S507, the vehicle surrounding recognition information generation unit 102 determines whether an instruction to complete the vehicle surrounding recognition process has been input, and completes the processing (S509) if it is determined that there is a completion instruction (yes in S508). The completion instruction corresponds to a power off of the vehicle surrounding recognition device 10, a main power off of the vehicle 2, and so on. If it is determined that there is no completion instruction (no in S508), the process again returns to S501 to repetitively execute a series of processing described above. The vehicle-to-vehicle relative relationship data group 123 and the vehicle group data group 124 are also held in a next processing cycle, and data relating to the vehicle-to-vehicle relative relationship determined in the past is accumulated. As a result, even if the vehicle-to-vehicle relative relationship cannot be determined sufficiently in one processing cycle, newly acquired information is added from the wireless communication unit 30, to thereby obtain the advantage that the vehicle-to-vehicle relative relationship is determined with time. In addition, as the accumulated data amount in the past grows larger, the number of base points for determining the relative relationship with the newly appearing vehicle grows bigger. Therefore, when information on the relative relationship between the vehicles is sufficiently created, it can be expected that the relative relationship between the vehicles can be determined relatively quickly even if the new vehicle appears.

As described above, according to the present embodiment, the vehicle surrounding recognition device 10 of the vehicle 2 determines whether to change the front-rear relationship between the two vehicles with the use of the position information on a plurality of other vehicles obtained by the vehicle-to-vehicle communication or the like, and the position information on the host vehicle. As a result, the vehicle surrounding recognition device 10 of the vehicle 2 determines the reciprocity between the vehicles, in other words, that the two appropriate vehicles are traveling in the different lanes. In addition, with the determination of the right-left relationship between the two vehicles, it is determined that the two appropriate vehicles are traveling in the different lanes. Since the front-rear relationship and the right-left relationship can be statistically determined taking the measurement error of the positions into account, erroneous determination on the relationship of the traveling lanes between the vehicles can be prevented.

Further, according to the present embodiment, the undetermined relationship between the traveling lanes of the plurality of vehicles can also be derived by the combination of the reciprocity between the vehicles determined as described above and a constraint logic based on the number of lanes in the road section. For example, in the two-lane road section, when the vehicle A and the vehicle B, and the vehicle B and the vehicle C have the reciprocities with each other, it can be determined that the vehicle A and the vehicle C travel in the same lane based on the constraining logic. In this manner, with the use of only the reciprocity between the vehicles in which the erroneous determination is unlikely to occur, the relationship (the same lane or different lanes) between the vehicles traveling lanes can be determined with higher precision.

Further, according to the present embodiment, with the further use of not only the combination of the reciprocity between the vehicles, which is determined only between two vehicles, but also the relationship between the traveling lanes between vehicles, which is newly found by the constraint logic based on the number of lanes in the road section, the undetermined relationship of the traveling lanes among the other vehicles can be determined one after another. As a result, the relationship between the vehicle traveling lanes can be determined for the two vehicles separated from each other as much as the reciprocity and analogy between the vehicles can be directly determined in the same road section.

Second Embodiment

In the first embodiment, the vehicle surrounding recognition device 10 was configured to determine the relationship of the traveling lanes between the vehicles. In the second embodiment, a configuration in which the vehicle surrounding recognition device 10 according to the first embodiment further includes means for determining traveling lanes of each vehicle will be described.

Figure 14:
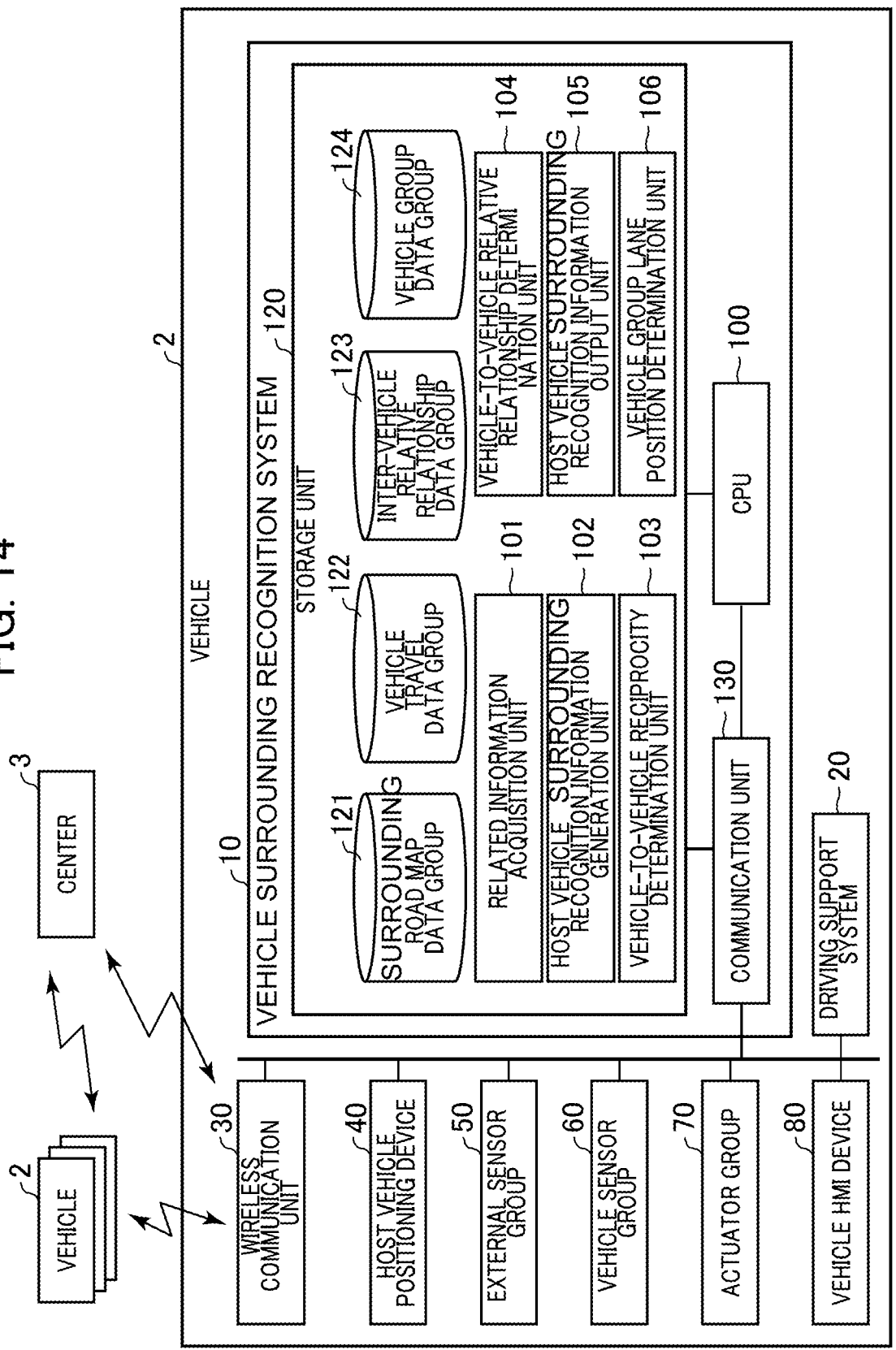
FIG. 14 is a functional block diagram illustrating another example of a configuration of a vehicle surrounding recognition system 1 according to a second embodiment of the present invention.

FIG. 14 is a functional block diagram illustrating an example of a configuration of a vehicle surrounding recognition system 1 according to the second embodiment. The vehicle surrounding recognition system according to the second embodiment is not changed in a substantial device configuration from that of the first embodiment, but is different from that of the first embodiment in that the storage unit 120 further includes a vehicle group lane position determination unit 106. The other functional configurations are the same as those of the first embodiment.

Figure 15:
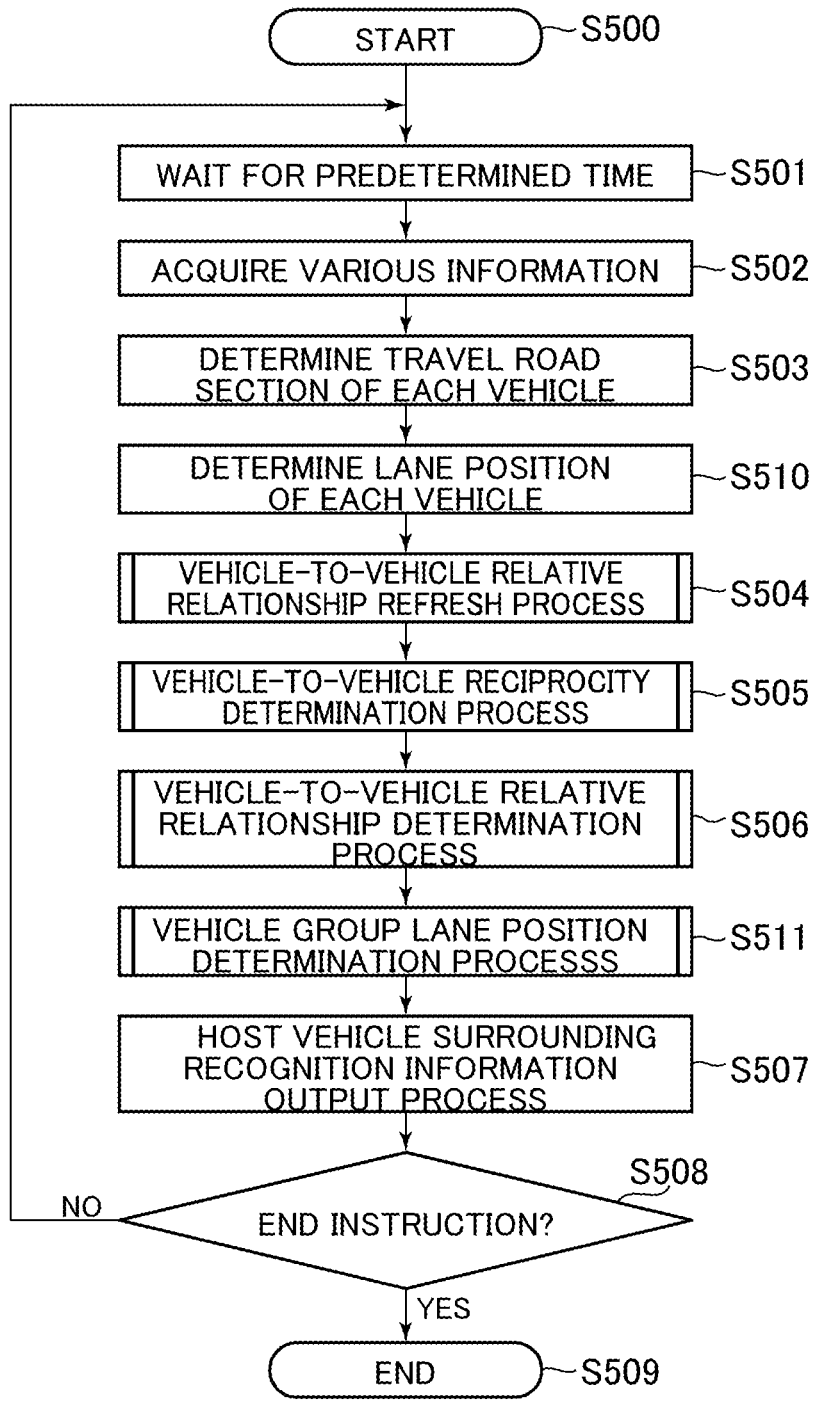
FIG. 15 is an illustrative view of a process flow example of a vehicle surrounding recognition process 500 to be executed in a vehicle surrounding recognition device 10 according to the second embodiment of the present invention.

FIG. 15 illustrates an example of a flow 550 of a vehicle surrounding recognition process to be executed in a vehicle surrounding recognition device 10 of a vehicle surrounding recognition system 1 according to the present embodiment. The present process flow is the same as the vehicle surrounding recognition process flow 500 according to the first embodiment, and is different in that a process (S510) for determining a lane position of each vehicle is newly added between S503 and S504, and a vehicle group lane position determination process (S511) is newly added between S506 and S507. Since the other steps are the same as those in the first embodiment, the newly added S510 and S511 will be described.

In Step S510, a vehicle group lane position determination unit 106 of the vehicle surrounding recognition device 10 determines a traveling lane of an appropriate vehicle as much as possible mainly with the use of information on the vehicle alone. For example, a traveling lane of a host vehicle can be specified by checking the types (broken lines, solid lines, double lines, and so on) and colors of lane boundary lines on both sides detected by an external sensor group 50 against lane boundary line information of an appropriate road section which can be acquired from a surrounding road map data group 121.

In addition, with the analysis of the behavior of a vehicle traveling data group 122, a lane in which the vehicle is traveling or has traveled can be determined. For example, when a certain vehicle has moved to a different road section (for example, detection with a temporal change of a traveling road section ID 208), if it can be confirmed that a turn signal (light) is blinking (turn signal 207) (lighting state) and a traveling direction (direction 206) is turning in a direction of the turn signal, it can be determined that the appropriate vehicle has turned left or right (vehicle behavior estimation unit). In other words, it can be determined that the appropriate vehicle has been located in a left-turnable lane or a right-turnable lane, while the vehicle has been traveling in a previous road section (vehicle behavior enable lane specification unit). Since a left-turnable lane or a right-turnable lane can be specified by referring to a surrounding road map data group 121, if there is only one appropriate lane, a travel lane in the previous road section can be determined. In other words, the traveling lane of a vehicle group ID to which the appropriate vehicle belongs in the previous road section can be determined and a lane ID 403 of the appropriate vehicle group ID in the vehicle group data group 124 can be updated.

Further, if both of the turn signals of the vehicle are blinking and it is confirmed that the vehicle has stopped, the vehicle group lane position determination unit 106 can estimate that the vehicle has temporarily stopped by the side of the road or the like, etc. Since the temporary stop by the side is enabled in an outermost (left in Japan) lane, it can be determined that the vehicle has traveled in that lane.

As described above, the lane in which the vehicle is traveling or has traveled can be determined on the basis of the determination of the behavior of the vehicle and a constraint condition on road attributes of the lane where the vehicle behavior can be taken.

In a vehicle group lane position determination process of S511, the traveling lane of the appropriate vehicle group is determined with the use of the information on the entire vehicle group, in contrast to S510 of determining the traveling lane of the appropriate vehicle with the use of the information on a single vehicle.

Figure 16:
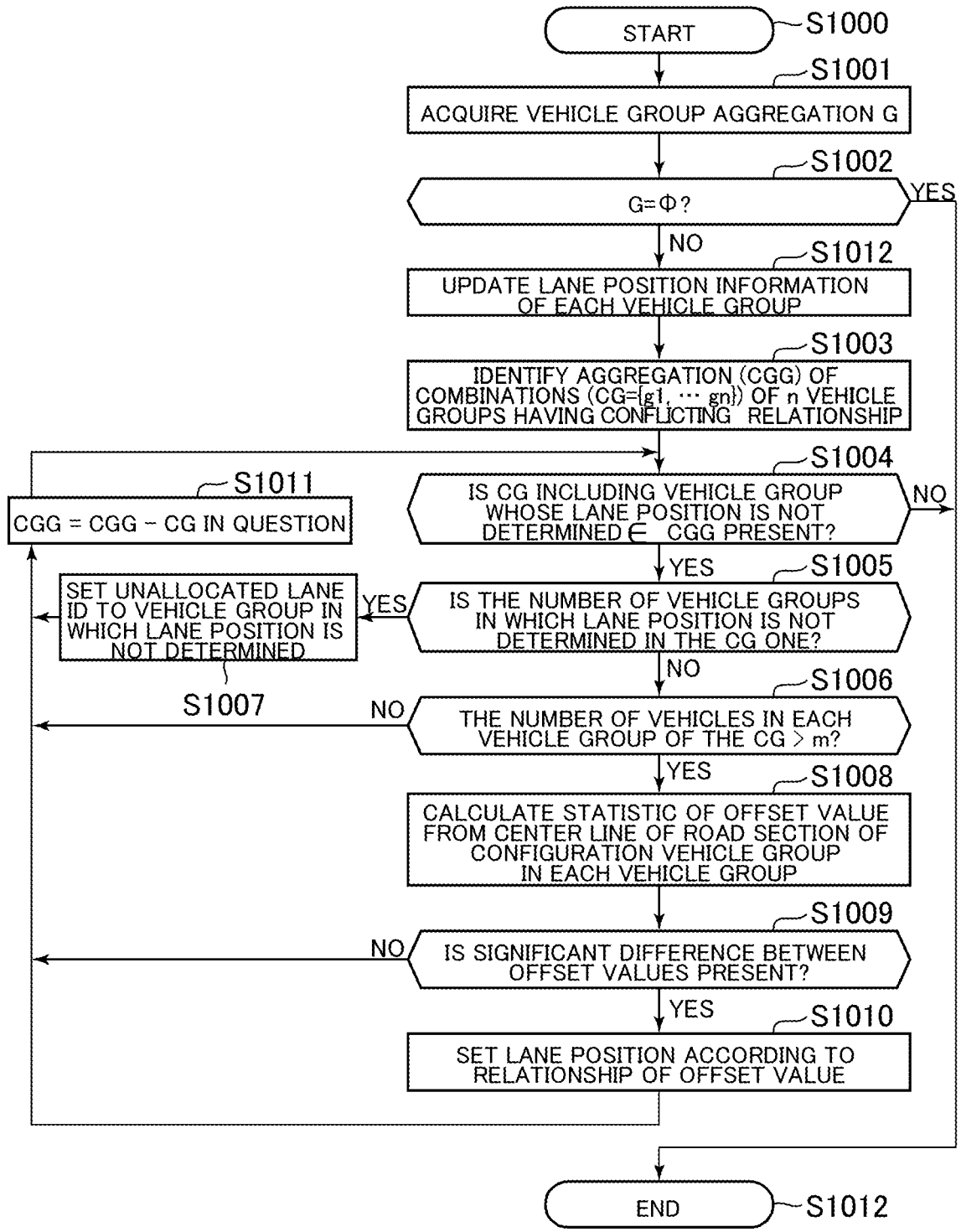
FIG. 16 is an illustrative view of a process flow example of a vehicle group lane position determination process 1000 to be executed in the vehicle surrounding recognition device 10 according to the second embodiment of the present invention.

As a specific example of a vehicle-to-vehicle group lane position determination process, FIG. 16 illustrates an example of a vehicle-to-vehicle group lane position determination process flow 1000.

Upon starting the processing in S1000, the vehicle group lane position determination unit 106 of the vehicle surrounding recognition device 10 first refers to a vehicle group data group 124 to acquire a vehicle group aggregation G (S1001). If the vehicle group aggregation G is an empty aggregation (Φ) (Yes in S1002), the processing is terminated. If the vehicle group aggregation G is not an empty aggregation (No in S1002), the process proceeds to S1012 to update the lane position information on each vehicle group. More specifically, referring to a lane ID 209 of a vehicle traveling data group 122 corresponding to the vehicle belonging to the appropriate vehicle group, if there is a specified lane ID, the specified lane ID is set as a lane ID 403 of the vehicle group. As a result, if the lane position of one vehicle can be specified within the vehicle group, the lane positions of all the vehicles in the vehicle group can be specified. As long as the k (k>1) configuration vehicles do not designate the same lane, it is possible not to determine the lane ID of the vehicle group. An increase in k makes it possible to determine the lane ID with higher precision.

Next, an aggregation (CGG) of the combinations of n vehicle groups having conflicting relationships with each other is specified from the vehicle group aggregation G (S1003).

Subsequently, the vehicle group lane position determination unit 106 confirms whether there is a combination (CG) of n vehicle groups including a vehicle group whose lane position has not been determined from the aggregation CGGs. If not present (no in S1004), the process is terminated. If the CG satisfying the condition is present (yes in S1004), the process proceeds to S1005. In the case where the number of vehicle groups in which the lane position has not been determined in the appropriate CG is one (yes in S1005), since it is naturally specified by the constraint logic that the lane position (lane ID) not allocated is the lane position of the vehicle group not determined, such setting is performed (S1007). After the appropriate CG is excluded from the aggregation CGG (S1011), the process returns to S1004, and the same processing is performed for another CG satisfying the condition.

In S1005, if the number of undetermined vehicle groups is two or more (no in S1005), the process proceeds to S1006. If the number of any configuration vehicles in the vehicle group of the appropriate CG (corresponding to the number of target vehicle ID group 405 of the vehicle group data group 124) is equal to or less than m (m is an integer value equal to or larger than 0) (no in S1006), the process advances to S1011, and the process related to the appropriate CG is terminated. If the number of all configuration vehicles is larger than m (yes in S1006), the process proceeds to S1008 to calculate the statistical quantity of an offset value from a center line of the road section of the configuration vehicle group for each vehicle group. In this case, m is a parameter for giving significance as the statistical quantity of the offset value. As the value of m grows larger, the variance of the statistical quantity of the offset value decreases and a significant difference improves more. On the contrary, since the information of other vehicles is needed, the easiness of establishment of a determinable environment decreases. The value of m may be determined according to trade-off between the significant difference of such statistical quantity and the easiness of determination. For example, the offset value is calculated as a distance to a point closest to a center line of the road section, based on the position information (latitude, longitude) of the configuration vehicle group and the position information of the center line of the road section. If there is a statistically significant difference between the respective offset values (yes in S1009), since the right-left relationship of each vehicle group can be determined by the magnitude of the offset value, the lane position of each vehicle group is set according to the offset value (S1010), and the process proceeds to S1011. If the significant difference cannot be determined for the respective offset values (no in S1009), the process proceeds to S1011 without doing anything, and the process related to the appropriate CG is terminated.

Processes of S1008 to S1010 in the vehicle group lane position determination process will be described with reference to FIG. 17.

Figure 17:
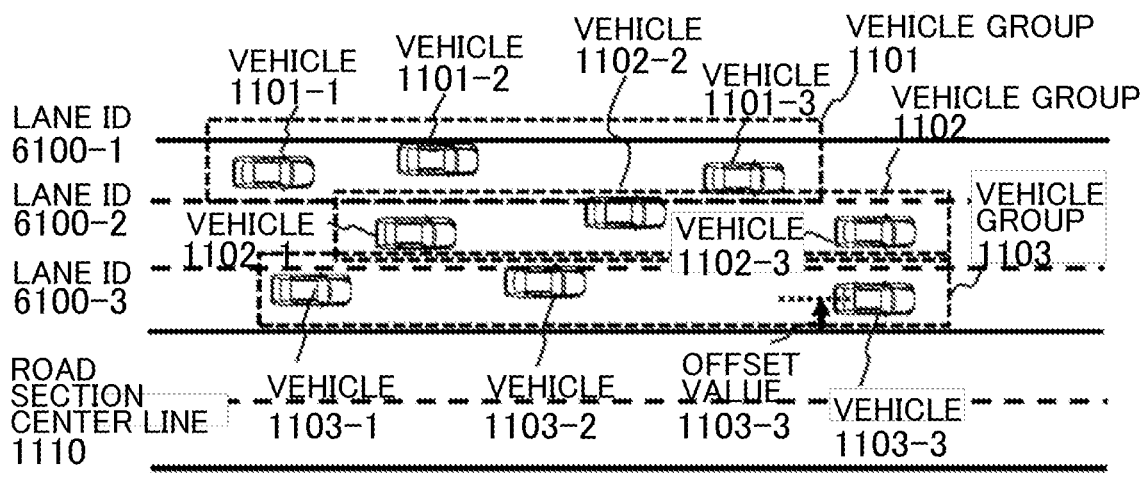
FIG. 17 is an illustrative view of an example of a specific scene illustrating a vehicle group lane position determination process 1000 in the vehicle surrounding recognition device 10 according to the second embodiment of the present invention.

An upper diagram of FIG. 17 illustrates the position information 203 on the vehicles (vehicles 1101-1 to 1101-3, vehicles 1102-1 to 1102-3, vehicles 1103-1 to 1103-3) and the vehicle groups 1101 to 1103 in a predetermined road section in the vehicle traveling data group 122. The offset value from the center line of the road section of the configuration vehicle group calculated in S1008 of the vehicle group lane position determination process indicates a length of the deviation from the road section center line 1110, as shown by, for example, the offset value 1103-3 of the vehicle 1103-3. Incidentally, the offset value is a value for comparing the positional relationship of each vehicle in a vertical direction to the lane of the road section, and the section center line is merely an example of a reference point.

A table in a lower stage of FIG. 17 shows a specific example of the statistical quantity of the offset value. An offset data string 1121 is a data string of an offset value of the configuration vehicle group of each vehicle group. A mean value 1122 is a mean value of the offset data string 1121. A variance value (standard deviation) is a variance value (standard deviation) of the offset data string 1121. Since the position information on each vehicle has a variation due to an error, it is difficult to determine by only the single data which lane the vehicle is traveling in. For example, although the vehicle 1101-3 and the vehicle 1102-2 are different in the vehicle group (traveling in different lanes), the difference is only 1.5 m. However, in the present embodiment, since the determination can be made in the form of the statistical quantity (mean value or variance value) within the group by leveraging the relationship within the vehicle group that the vehicles are traveling in the same lane, influence of the variation due to the error can be reduced. In the example of FIG. 17, although only three vehicles are present in each lane, the dispersion value becomes smaller as the number of vehicles grows bigger, and the lane position of each vehicle group can be determined with higher precision.

If it is determined in S1109 that there is a significant difference between the vehicle groups, lane IDs from the left side are allocated in order of magnitude of the offset value.

For example, in the case where "vehicle group 1101>vehicle group 1102>vehicle group 1103" can be specified, the lanes 6100-1 to 6100-3 are allocated to the vehicle groups 1101 to 1103, respectively.

Returning to FIG. 16, when a series of processes in S1004 to S1010 of the vehicle group lane position determination process has been completed, the appropriate CG is removed from the aggregation CGG in S1011, and the series of processes are repeatedly executed again. Eventually, when CG satisfying the condition of S1004 disappears from the aggregate CGG, the present process is terminated (S1012).

As described above, according to the present embodiment, the vehicle surrounding recognition device 10 of the vehicle 2 can estimate the vehicle behavior such as a right turn and a left turn by leveraging the movement information such as the traveling orientation of the vehicle and the control information such as a turn signal, and specify the lane in which the vehicle has traveled by combining with the constraint condition of the vehicle behavior in the lane in the appropriate road section.

Further, according to the present embodiment, the lane position of a predetermined vehicle is specified with the use of the predetermined means as described above, there being capable of specifying the lane positions of all the vehicles within the same vehicle group in combination with the commonality (vehicle group) between the vehicles specified in the same manner as that in the first embodiment.

Further, according to the present embodiment, the vehicle surrounding recognition device 10 of the vehicle 2 leverages the commonality (vehicle group) between the vehicles specified in the same manner as that in the first embodiment, and compares the statistical quantity of the position information on the vehicle group that is traveling in the same lane to reduce the influence of the error included in the position information of the single vehicle, thereby being capable of determining the lane position of each vehicle group with higher precision.

Further, a system of specifying the lane position based on the statistical quantity for each vehicle group can also be applied to the vehicle-to-vehicle relative relation determination process (S506) of the vehicle surrounding recognition process flow 550. For example, S808 to S811 in the vehicle-to-vehicle relative relationship determination process flow 800 shown in FIG. 11, which is an example of the vehicle-to-vehicle relative relationship determination process, is a process of integrating vehicle group groups in which different vehicle group IDs are allocated to the same lane. The steps can also be leveraged for that integrating process. If it can be determined that the offset values of the vehicle group A and the vehicle group B are caused by statistically the same population, the vehicle group A and the vehicle group B can be integrated.

The embodiments described above are examples, and the present invention is not limited to the above embodiments. In other words, the present invention can perform various applications, and every embodiment is encompassed in the scope of the present invention. For example, in the above embodiments, each processing of the vehicle surrounding recognition device 10 is realized by executing a predetermined operation program with the use of a processor and a RAM. However, the processing may be realized by unique hardware as necessary. In the above embodiments, the vehicle surrounding recognition device, the driving support device, the wireless communication unit, the host vehicle position measurement device, the external sensor group, the vehicle sensor group, the actuator group, and the in-vehicle HMI device are described as individual devices. However, those devices can be realized by combining any two or more devices together as necessary.

For example, in the embodiments described above, the process of determining the relative relationship between the vehicles is realized by execution by the vehicle surrounding recognition device 10. Alternatively, the same function may be realized by executing the process by the center 3 and a roadside device (not shown) configured to be communicable with the vehicle 2, and providing the information related to the determined relative relationship between the vehicles to each vehicle 2 by wireless communication.

When the above respective processes may be realized by allowing a processor to execute a predetermined operation program, the information on the operation program, tables, files, and so on for realizing the respective processes can be stored in a storage device such as a nonvolatile semiconductor memory, a hard disk drive, or an SSD (Solid State Drive), or a computer readable non-transitory data storage medium such as an IC card, an SD card, or a DVD.

Also, the control lines and the information lines considered necessary for description of the embodiments are illustrated in the drawings, and all of the control lines and the information lines necessary for actual products according to the present invention are not illustrated. In fact, it may be conceivable that most of the configurations are connected to each other.

The invention claimed is:

1. A vehicle information processing apparatus for improving the detection of a relative position relationship between a plurality of vehicles including a host vehicle that travel on a road having a plurality of lanes in the same direction, the vehicle information processing apparatus comprising:
a processing device;
a communication device; and
a storage unit comprising one or more storage devices, the storage unit comprising:
a vehicle travel information acquisition unit that is configured to acquire first vehicle travel information from a plurality of sensors including at least one of position information and speed information measured for a first vehicle of the plurality of vehicles, and second vehicle travel information including at least one of position information and speed information measured for a second vehicle of plurality of vehicles;
a vehicle travel information processing unit configured to successively compare the first vehicle travel information with the second vehicle travel information and to determine whether the first vehicle and the second vehicle have reciprocity, wherein reciprocity is attribute information indicating a state in which the first vehicle and the second vehicle travel in different lanes and is determined based on an event that cannot occur when the first vehicle and the second vehicle travel in the same lane;
a lane number specifying unit configured to acquire, via the plurality of sensors, the number of lanes of the road on which the plurality of vehicles are traveling;
a vehicle-to-vehicle relative relationship determination unit configured to:
compare the reciprocity existing among the vehicles included in a vehicle group with each other with respect to a plurality of combinations of two vehicles determined by the vehicle traveling information processing unit to have the reciprocity,
apply a plurality of combinations of vehicle groups each including a plurality of vehicles, or a plurality of combinations of the vehicle and the vehicle group, as a constraint condition, such that the acquired number of lanes is a maximum value of the number of combinations of the vehicles or the vehicle groups having reciprocity with each other,
integrate the plurality of vehicles or the vehicle groups into one vehicle group when it is determined that there are a plurality of vehicles or vehicle groups having the reciprocity with the same vehicle or the same vehicle group, and
determine relative relationships of the plurality of vehicles based on the determined reciprocity, the plurality of combinations and the integrated vehicle groups; and
wherein upon receiving the relative relationships of the plurality of vehicles the host vehicle alters a vehicle speed control.

2. The vehicle information processing apparatus according to claim 1,
wherein the vehicle travel information processing unit successively compares position information of the first vehicle with position information of the second vehicle, and determines that reciprocity is established between the first vehicle and the second vehicle when it is detected that a front-rear relationship between the first vehicle and the second vehicle is changed and
the front-rear relationship is a front-rear relationship between the first vehicle and the second vehicle with respect to a traveling direction of the road.

3. The vehicle information processing apparatus according to claim 1,
wherein the constraint condition is the acquired number of lanes and the vehicle-to-vehicle relative relationship determination unit determines whether a vehicle of the plurality of vehicles is traveling in a different lane or in a same lane as that of all the combinations of the vehicles or the vehicle groups that have been determined to have reciprocity under the constraint condition.

4. The vehicle information processing apparatus according to claim 1,
wherein the vehicle-to-vehicle relative relationship determination unit determines that there is reciprocity between the first vehicle and the second vehicle among the plurality of vehicles when the acquired number of lanes is two, and determines that there is reciprocity between the first vehicle and a third vehicle when it is determined that there is no reciprocity between the second vehicle and the third vehicle.

5. The vehicle information processing apparatus according to claim 1,
wherein the vehicle-to-vehicle relative relationship determination unit determines that there is reciprocity between the first vehicle and the second vehicle, and between a third vehicle and a fourth vehicle of the plurality of vehicles when the acquired number of lanes is two, and determines that the first vehicle and the second vehicle travel in the same lane when there is no reciprocity between the second vehicle and the third vehicle.

6. The vehicle information processing apparatus according to claim 1, the storage unit further comprising a lane position determination unit that is configured to determine a current or past traveling lane position of the first vehicle,
wherein the lane position determination unit determines a traveling lane position of another vehicle of the plurality of vehicles with the acquired number of lanes as a constraint condition, based on the determined traveling lane position of the first vehicle and a relative positional relationship of a traveling lane of the other vehicle relative to the first vehicle.

7. The vehicle information processing apparatus according to claim 6,
wherein the vehicle travel information acquisition unit further acquires lighting state information comprising information on a lighting state of lamps of the plurality of vehicles, and
the lane position determination unit includes:
a vehicle behavior estimation unit configured to estimate a behavior of the first vehicle based on the lighting state information acquired from the first vehicle; and
a vehicle behavior enable lane specifying unit configured to specify a lane in which the estimated vehicle behavior is enabled in a road section where the first vehicle exists, and
determine that the travel lane position of the first vehicle is the specified lane when it is determined that the number of specified lanes is one.

8. The vehicle information processing apparatus according to claim 1, the storage unit further comprising a vehicle group-to-vehicle group lane positional relationship determination unit that acquires a first vehicle group and a second vehicle group determined to have reciprocity, the first vehicle group and the second vehicle group each comprises a plurality of vehicles determined to be traveling in the same lane by the vehicle-to-vehicle relative relationship determination unit, and compares a position of a vehicle of the first vehicle group in a lane crossing direction in the road section with a position of a vehicle of the second vehicle group in the lane crossing direction in the road section to determine a right-left relationship of the traveling lane between the first vehicle group and the second vehicle group.

9. The vehicle information processing apparatus according to claim 8,
wherein a statistical quantity relating to a position of each vehicle of the vehicle group in the lane crossing direction is used as a position of each vehicle group in the lane crossing direction in the road section.

10. The vehicle information processing apparatus according to claim 8,
wherein combinations of the lane positional relationship between the vehicle groups determined by the vehicle group-to-vehicle group lane positional relationship determination unit are compared with each other, and the traveling lane position of the vehicle group is specified with the acquired number of lanes as a constraint condition that is an upper limit value of the number of vehicle groups.

11. A non-transitory computer-readable medium storing instructions within which, when executed by a processor, cause the processor to execute a vehicle information processing program for improving the detection of a relative position relationship between a plurality of vehicles including a host vehicle that travel on a road having a plurality of lanes in the same direction, the vehicle information processing program comprising:
acquiring first vehicle travel information from a plurality of sensors including at least one of position information and speed information measured for a first vehicle of the plurality of vehicles, and second vehicle travel information including at least one of position information and speed information measured for a second vehicle of the plurality of vehicles;
successively comparing the first vehicle travel information with the second vehicle travel information acquired by a vehicle travel information acquisition unit, and determining that reciprocity, which is attribute information indicating a state in which the first vehicle and the second vehicle travel on different lanes, is established between the first vehicle and the second vehicle if it is determined that an event that cannot occur when the first vehicle and the second vehicle travel in the same lane occurs, acquiring, via the plurality of sensors, the number of lanes of the road on which the plurality of vehicles are traveling;

comparing the reciprocity existing among the vehicles included in a vehicle group with each other with respect to a plurality of combinations of two vehicles determined by the vehicle traveling information processing unit to have the reciprocity;

applying a plurality of combinations of vehicle groups each including a plurality of vehicles, or a plurality of combinations of the vehicle and the vehicle group, as a constraint condition, such that the acquired number of lanes is a maximum value of the number of combinations of the vehicles or the vehicle groups having reciprocity with each other;

integrating the plurality of vehicles or the vehicle groups into one vehicle group when it is determined that there are a plurality of vehicles or vehicle groups having the reciprocity with the same vehicle or the same vehicle group;

determining relative relationships of the plurality of vehicles based on the determined reciprocity, the plurality of combinations and the integrated vehicle groups; and wherein upon receiving the relative relationships of the plurality of vehicles the host vehicle alters a vehicle speed control.

* * * * *